United States Patent
Kang et al.

(10) Patent No.: US 7,952,252 B2
(45) Date of Patent: *May 31, 2011

(54) INNER ROTOR TYPE PERMANENT MAGNET EXCITED TRANSVERSE FLUX MOTOR

(75) Inventors: Do Hyun Kang, Changwon-si (KR); Jung Hwan Chang, Changwon-si (KR); Ji Young Lee, Masan-si (KR); Ji Won Kim, Busan (KR); Shi Uk Chung, Changwon-si (KR)

(73) Assignee: Korea Electrotechnology Research Institute, Gyeongsangnam-Do (KR)

( * ) Notice: Subject to any disclaimer, the term of this patent is extended or adjusted under 35 U.S.C. 154(b) by 334 days.

This patent is subject to a terminal disclaimer.

(21) Appl. No.: 12/003,611

(22) Filed: Dec. 28, 2007

(65) Prior Publication Data
US 2008/0211326 A1    Sep. 4, 2008

(30) Foreign Application Priority Data

Dec. 28, 2006   (KR) .................. 10-2006-0135779

(51) Int. Cl.
*H02K 1/12* (2006.01)
(52) U.S. Cl. ... 310/216.015; 310/216.023; 310/216.033; 310/216.057; 310/216.067
(58) Field of Classification Search ... 310/216.004–216.019, 216.023–216.035, 310/216.045–216.062, 216.067, 216.102–216.105, 310/216.109–216.113, 216.127, 216.129
See application file for complete search history.

(56) References Cited

U.S. PATENT DOCUMENTS

| | | | | |
|---|---|---|---|---|
| 5,051,637 A | * | 9/1991 | Harris et al. | 310/90.5 |
| 5,221,503 A | * | 6/1993 | Ward et al. | 264/104 |
| 7,042,130 B2 | * | 5/2006 | Zepp et al. | 310/216.102 |
| 7,148,598 B2 | * | 12/2006 | Ionel et al. | 310/156.55 |
| 7,626,308 B2 | * | 12/2009 | Kang et al. | 310/254.1 |

* cited by examiner

*Primary Examiner* — Tran N Nguyen
(74) *Attorney, Agent, or Firm* — Frommer Lawerence & Haug LLP; Ronald R Santucci

(57) ABSTRACT

Disclosed herein is an inner rotor type permanent magnet excited transverse flux motor, in which a laminated structure in an axial direction or in a radial shape is applied to a stator iron core so as to employ a small amount of permanent magnets compared with a conventional outer rotor type permanent magnet excited transverse flux motor, thus providing high output power, increasing the efficiency of power generation, and reducing noise and vibration. For this, the present invention provides an inner rotor type permanent magnetic excited transverse flux motor comprising: a stator including a stator powdered iron core press-molded using a mold, a stator laminated iron core laminated on upper and lower layer portions of the circumference of the stator powdered iron core at regular intervals, and a stator winding which winds the segmented stator powdered iron core in which a current flows is wound between the intervals; and a rotor in which a rotor permanent magnet and a rotor powdered iron core are arranged alternately to face each other.

5 Claims, 33 Drawing Sheets

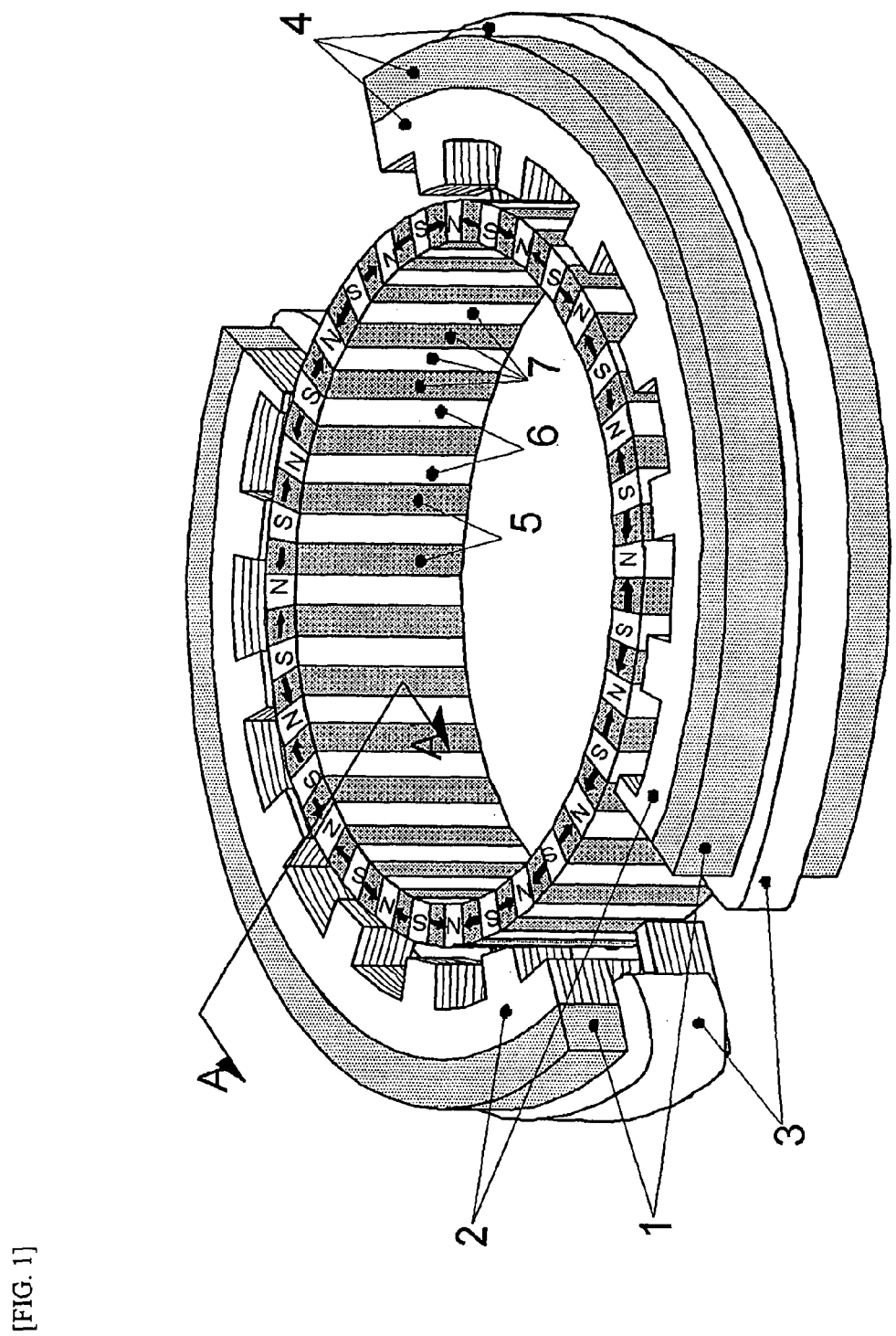
[FIG. 1]

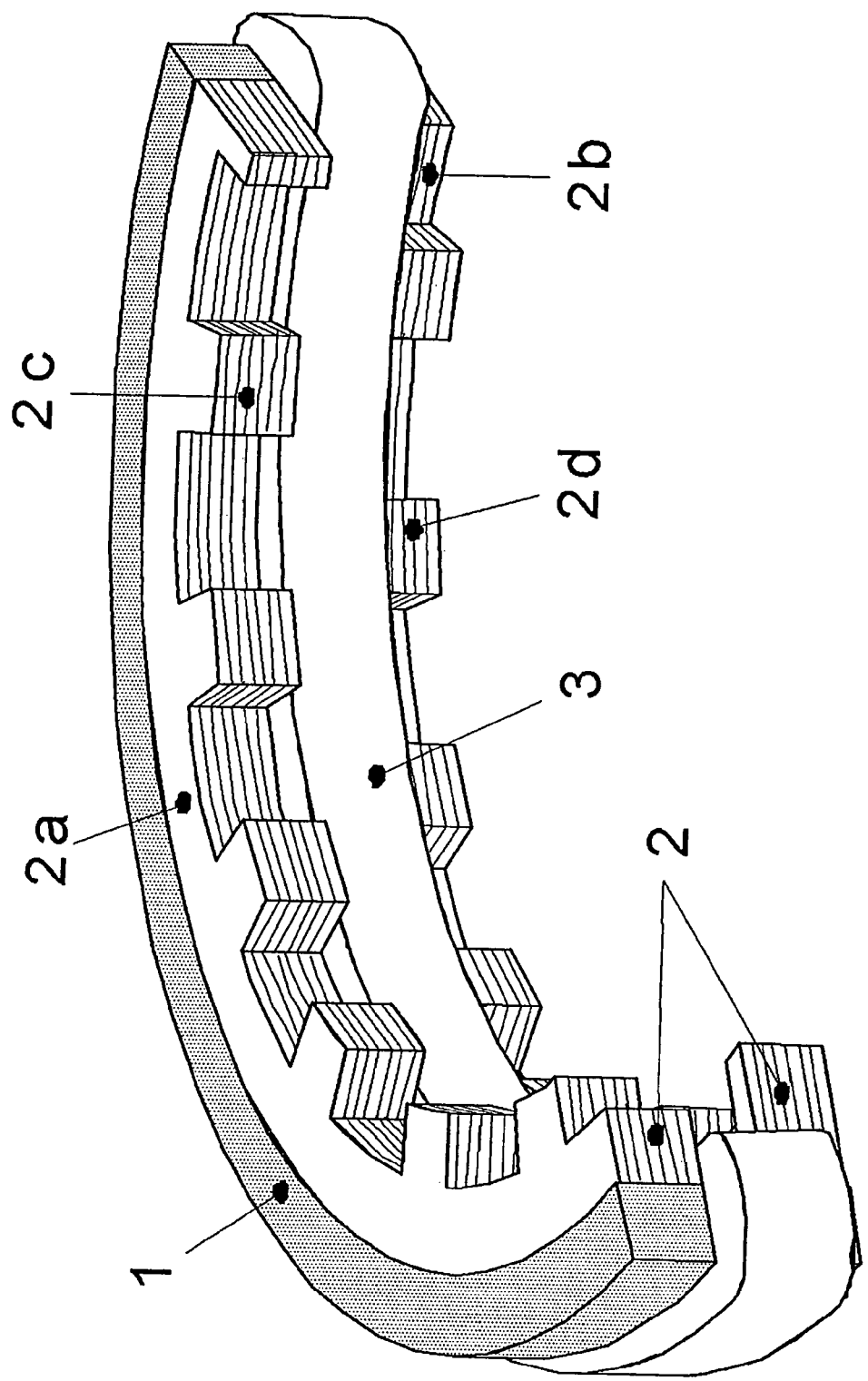
[FIG. 2]

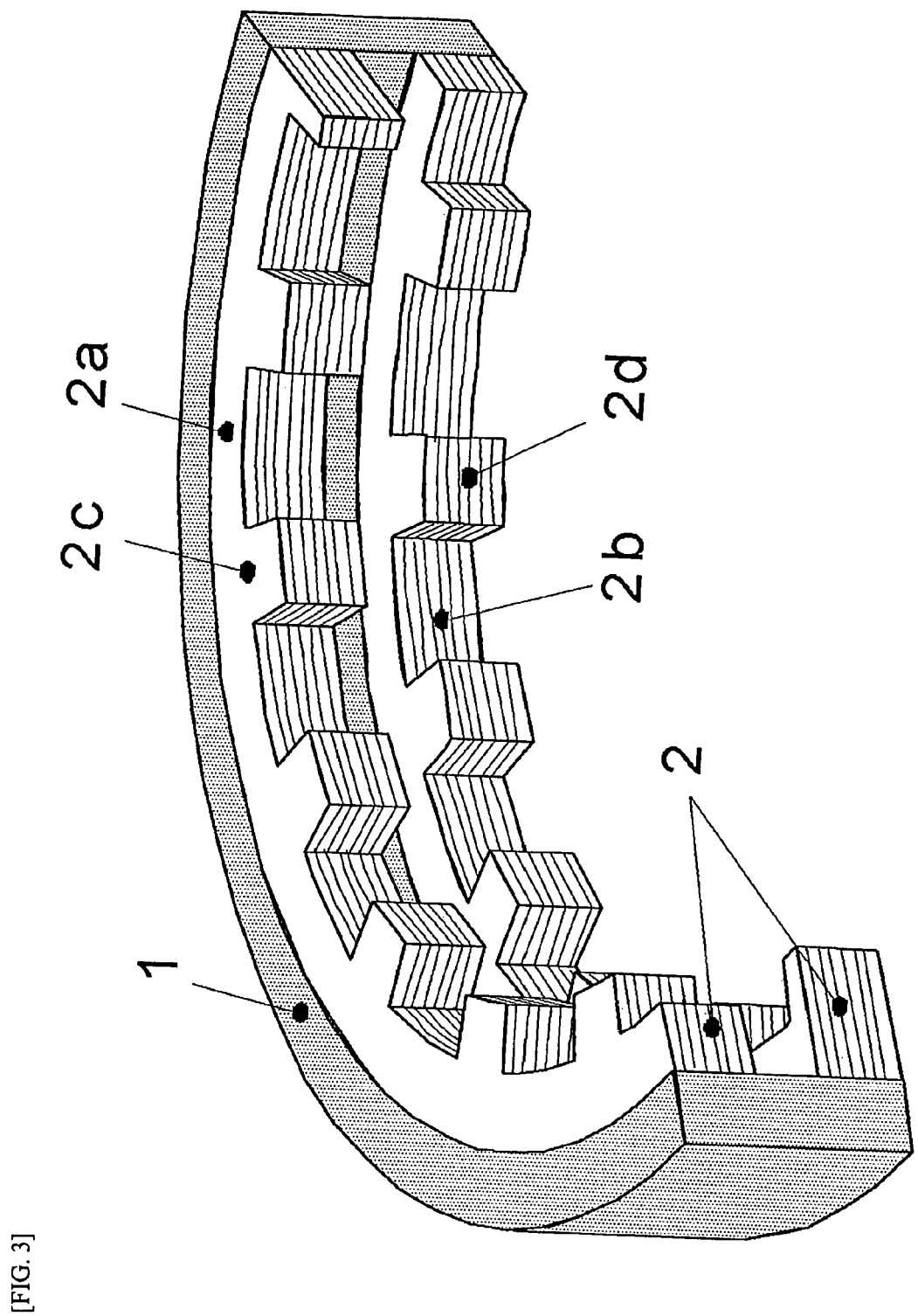
[FIG. 3]

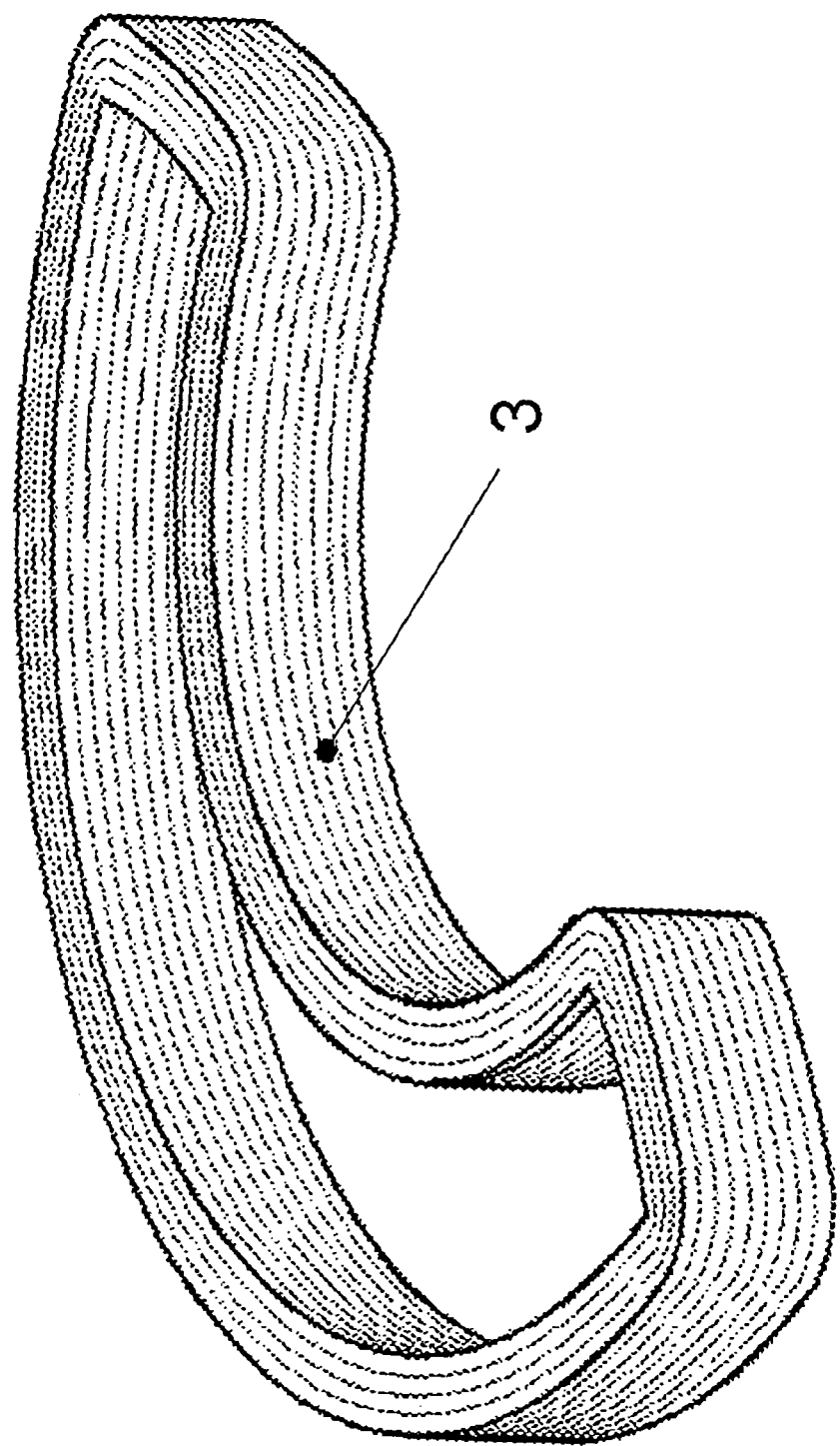
[FIG. 4]

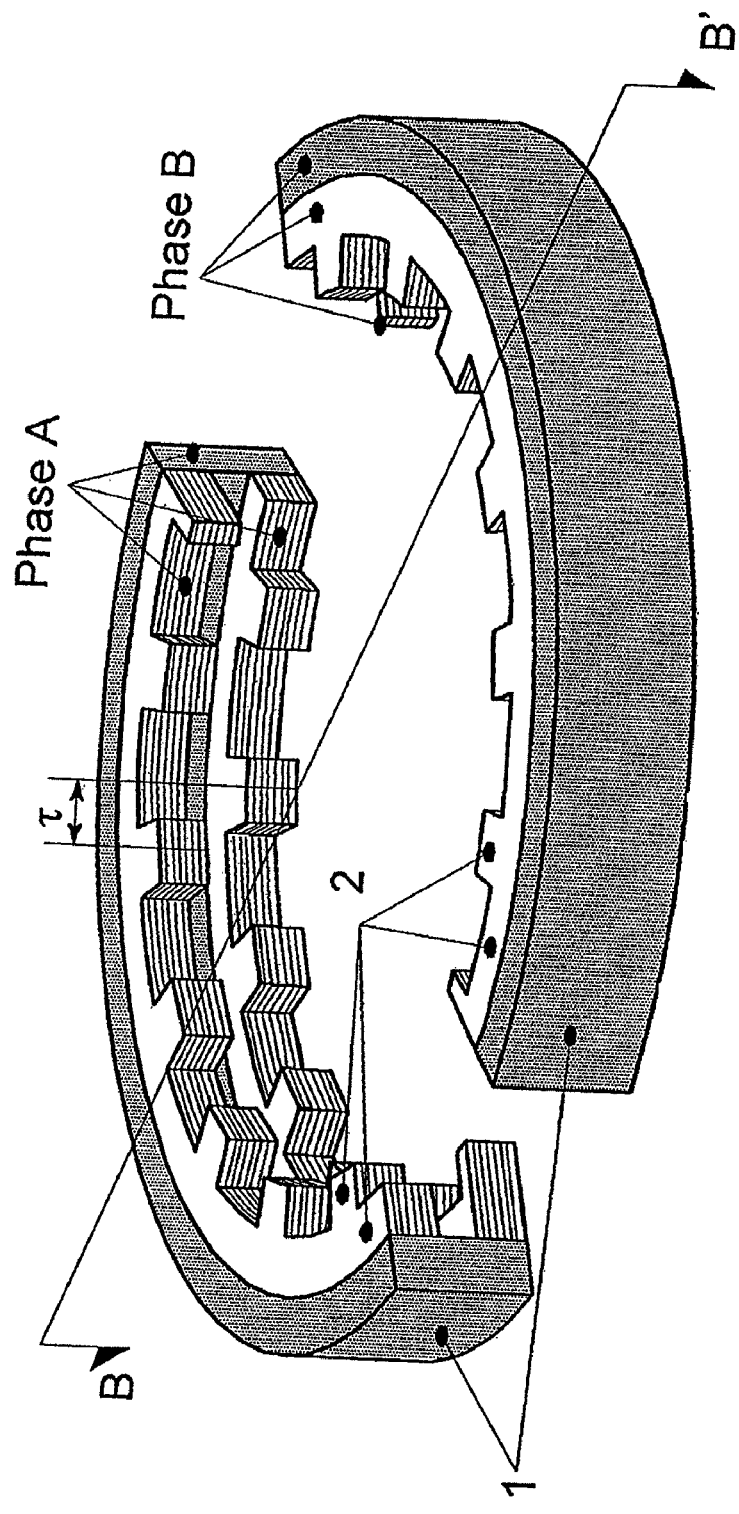
[FIG. 5]

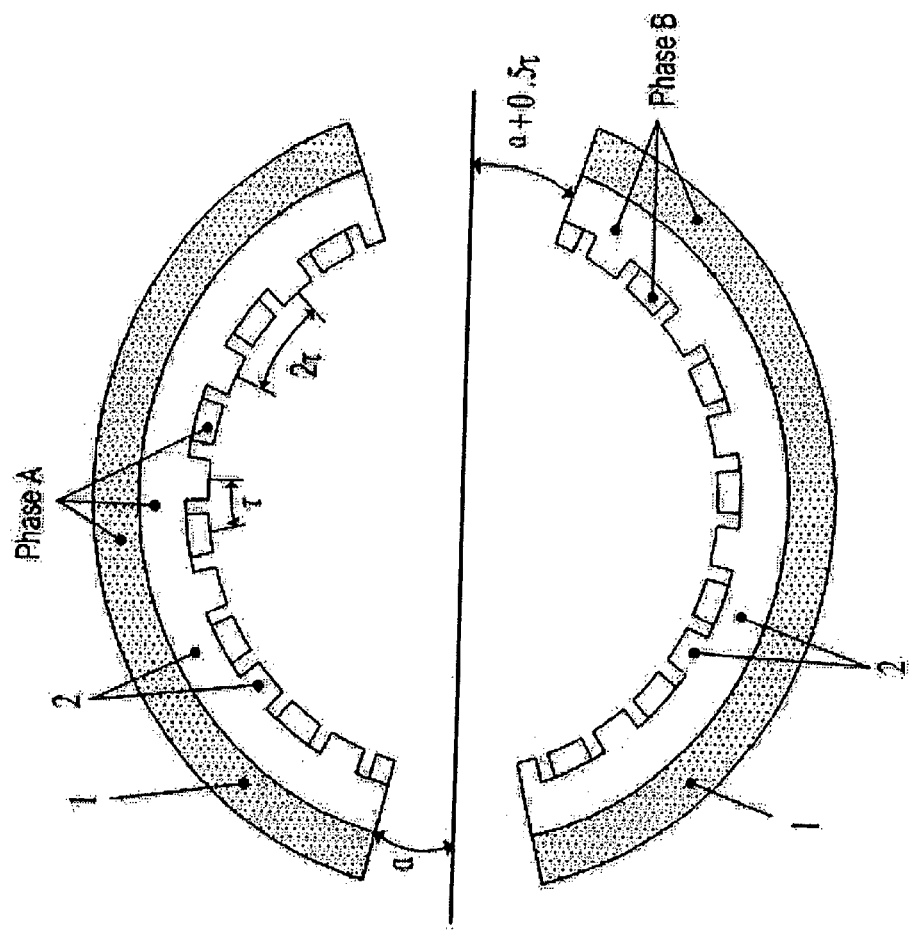
[FIG. 6]

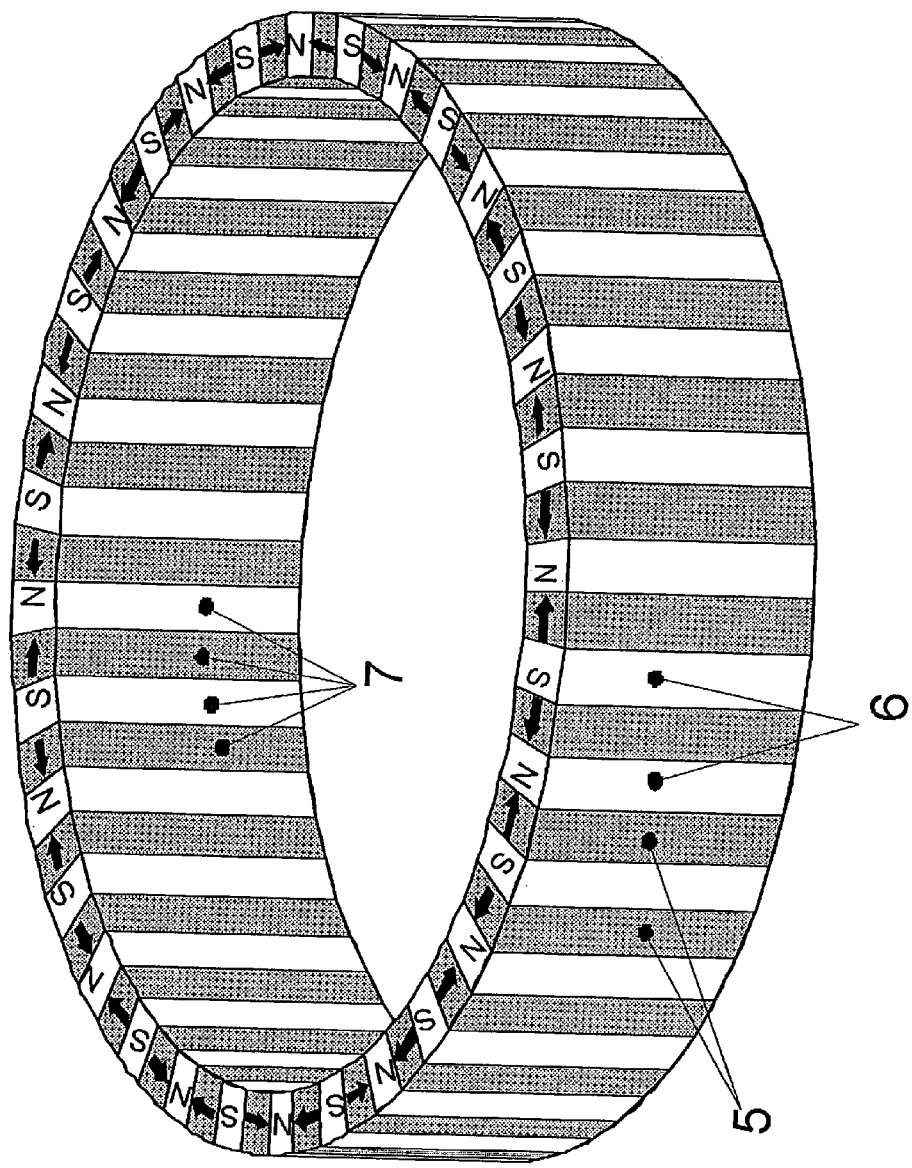
[FIG. 7]

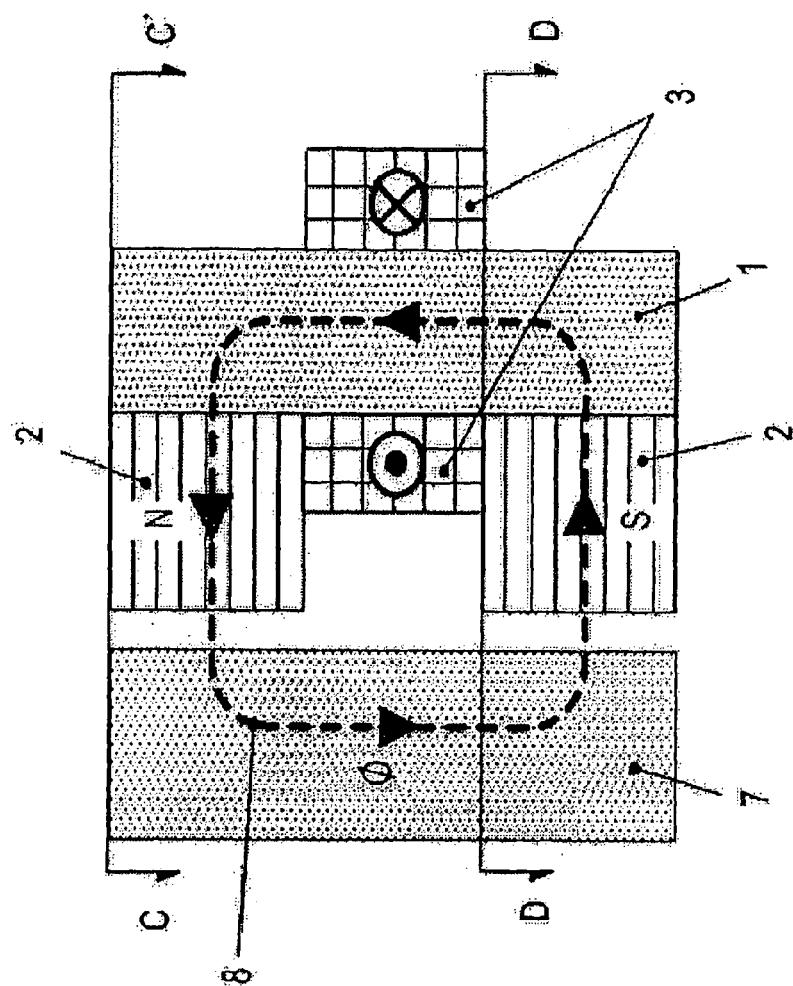
[FIG. 8]

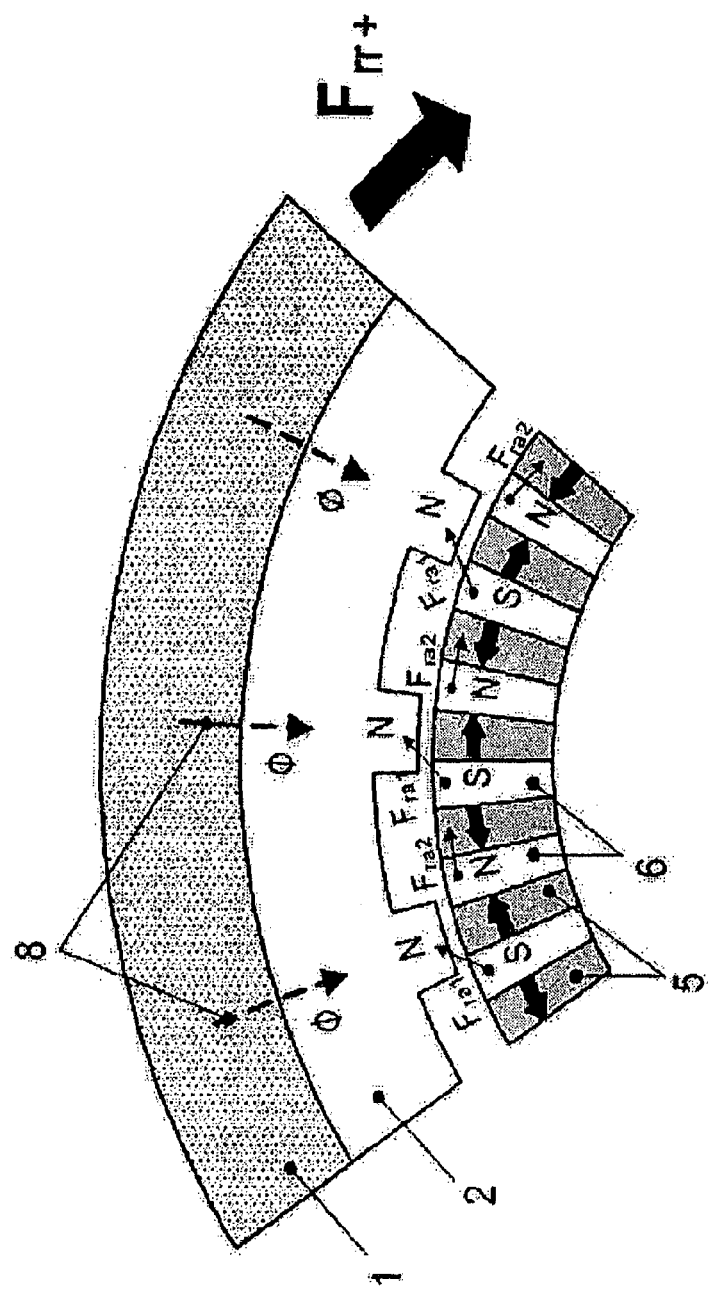
[FIG. 9a]

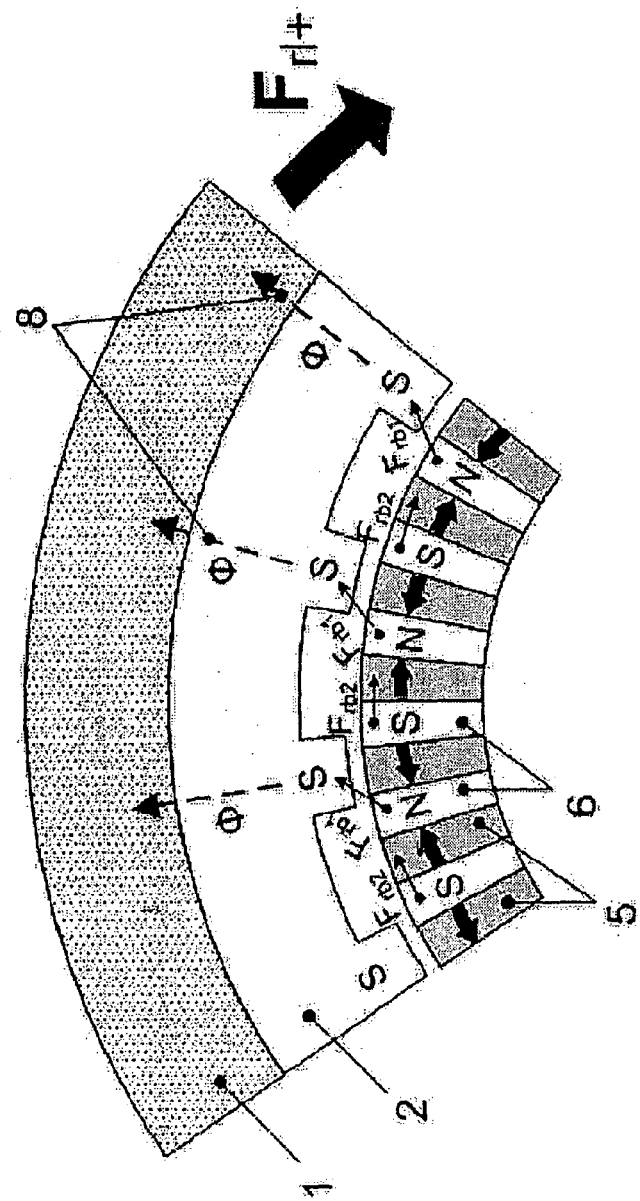
[FIG. 9b]

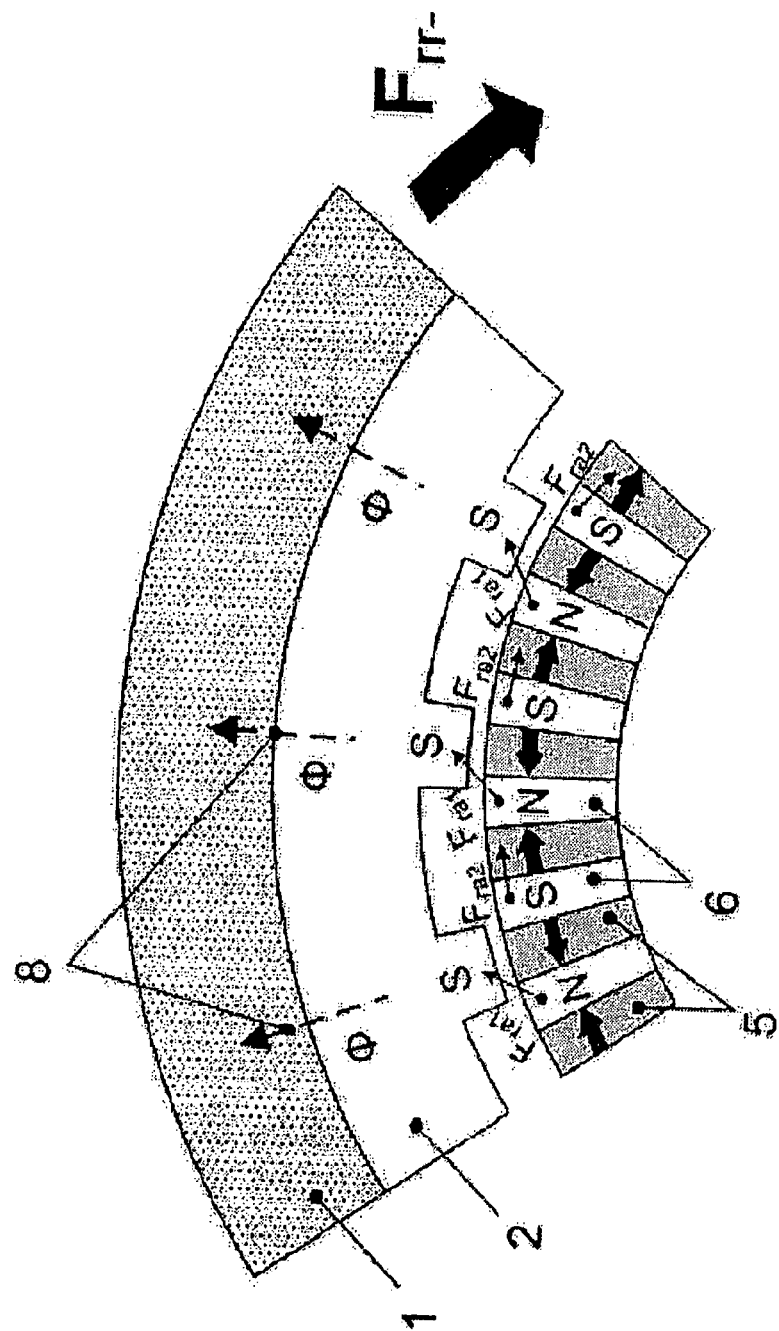
[FIG. 9c]

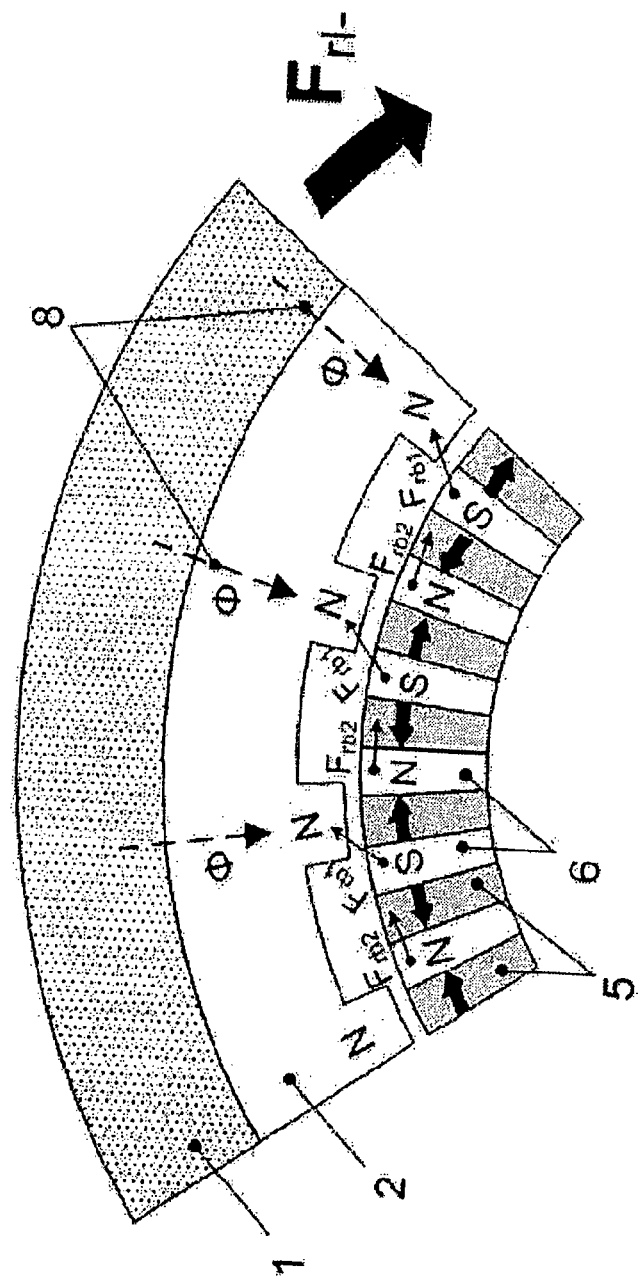
[FIG. 9d]

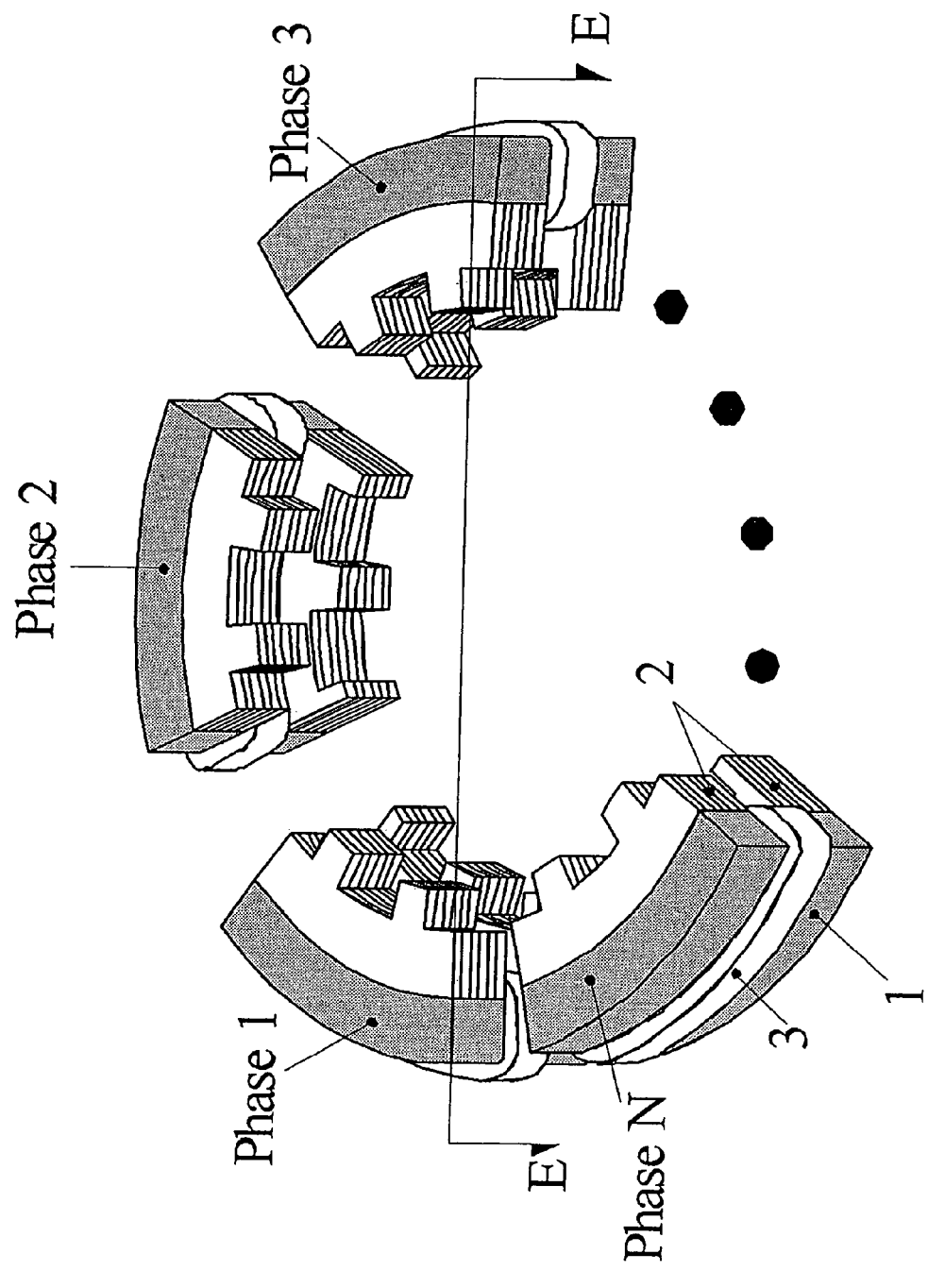
[FIG. 10]

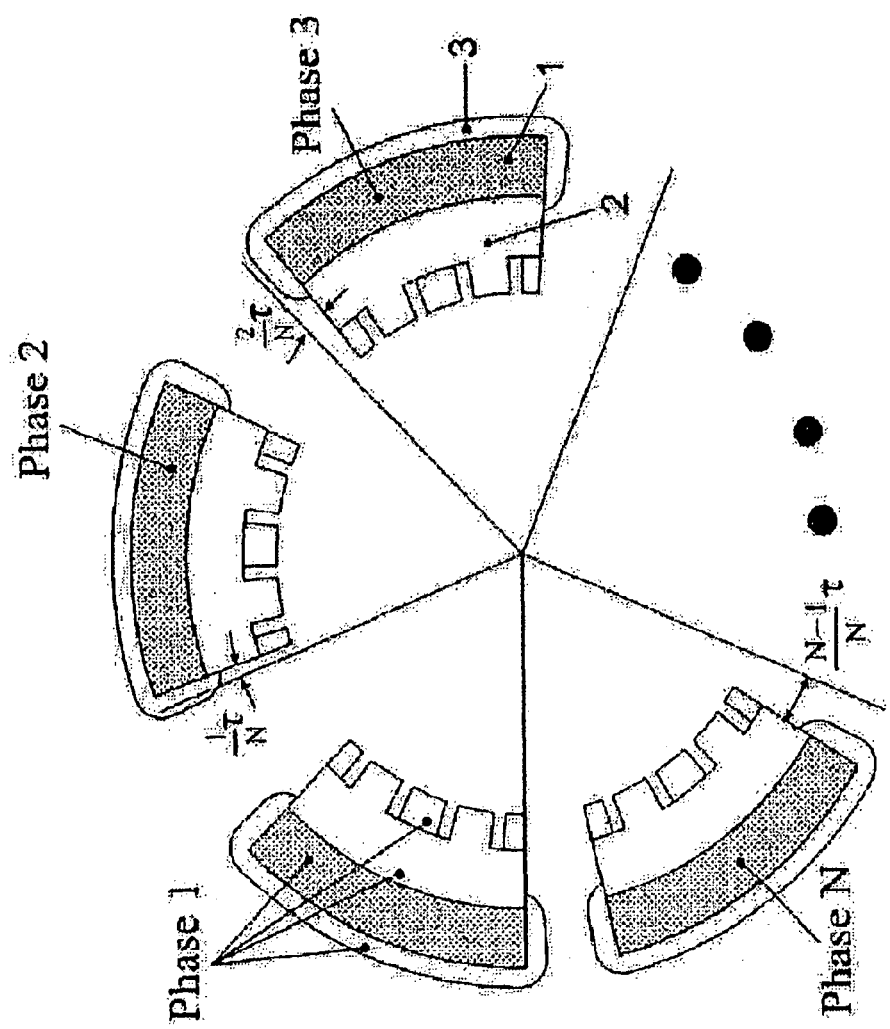
[FIG. 11]

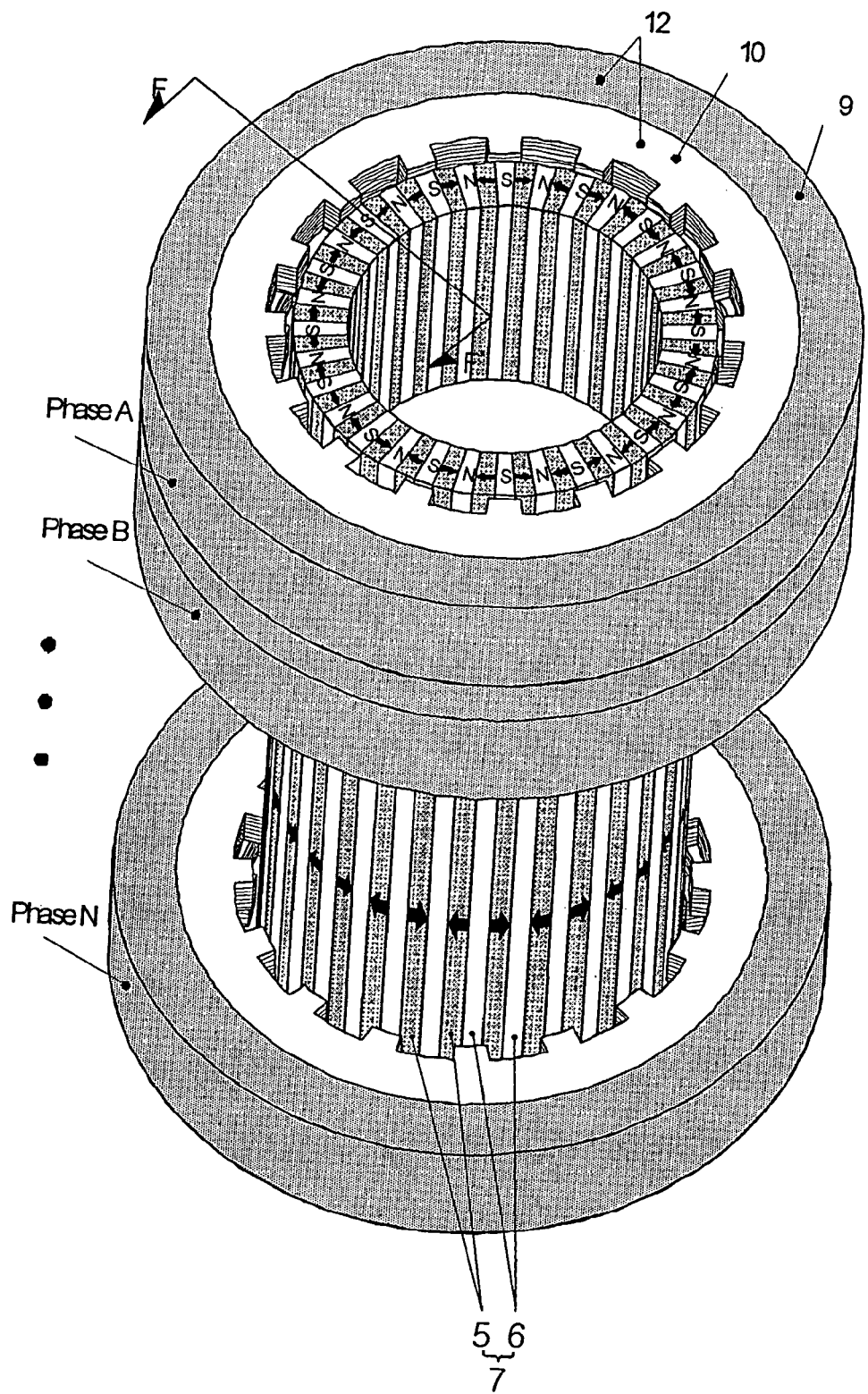
[FIG. 12]

[FIG. 13]
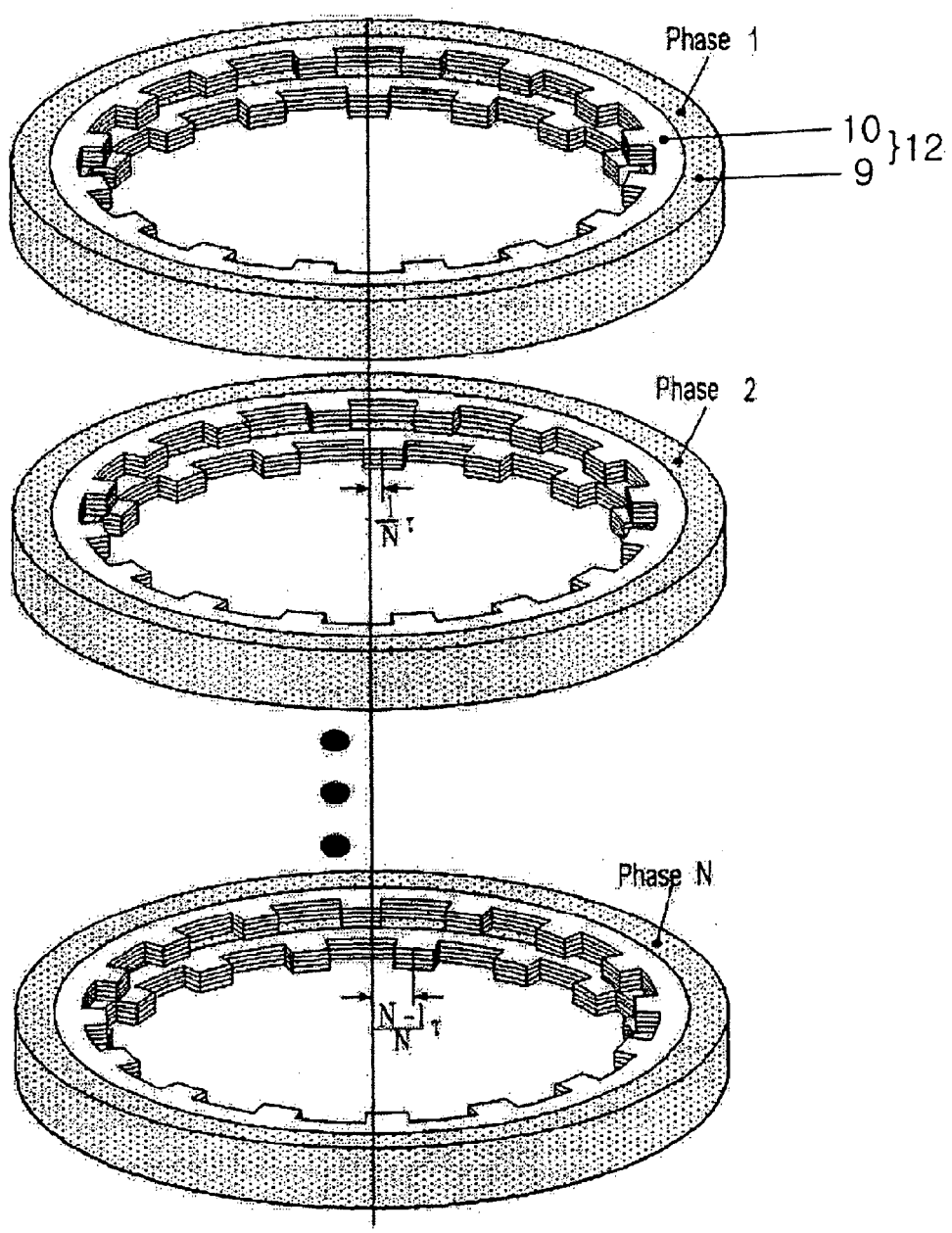

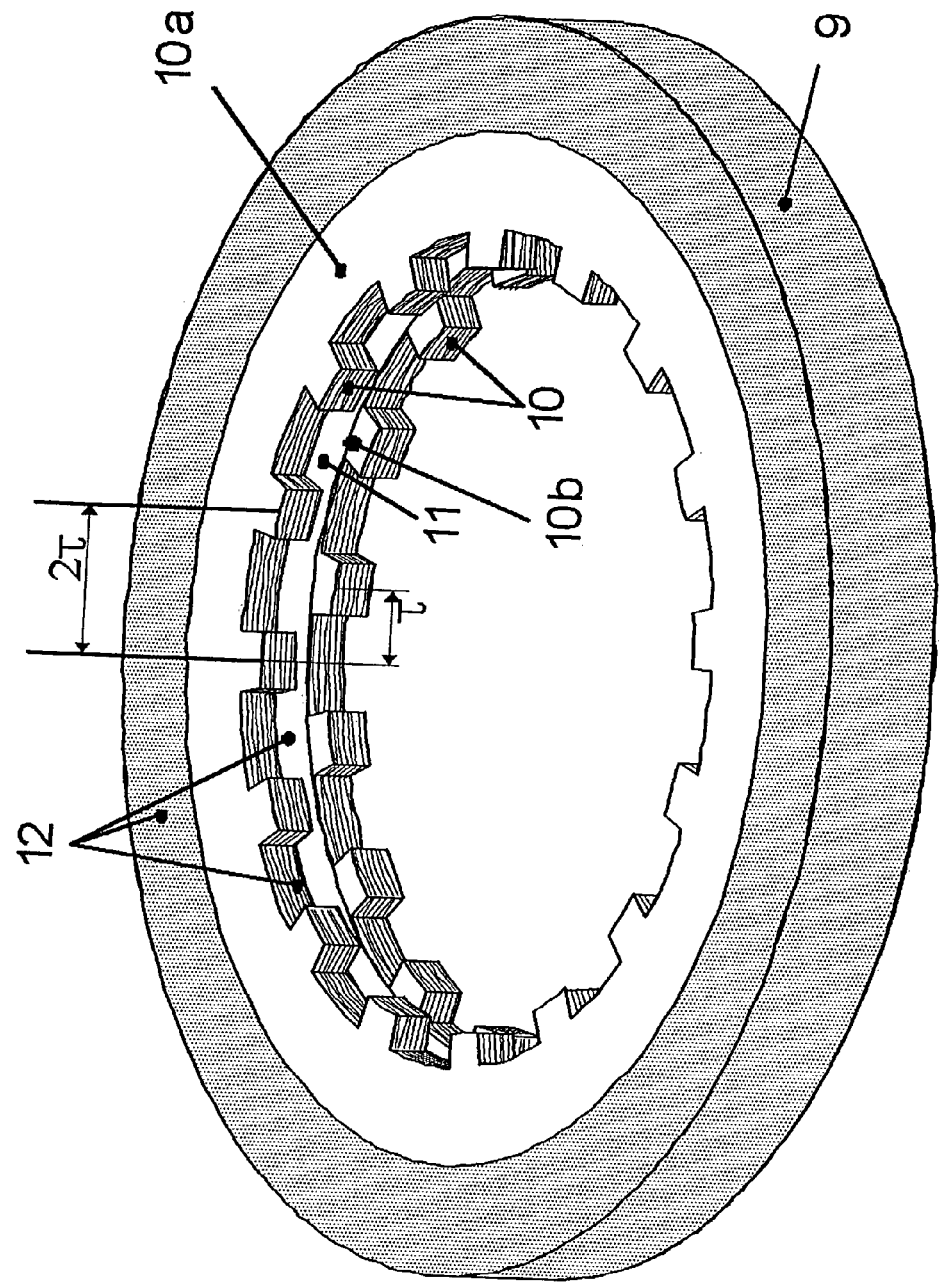
[FIG. 14]

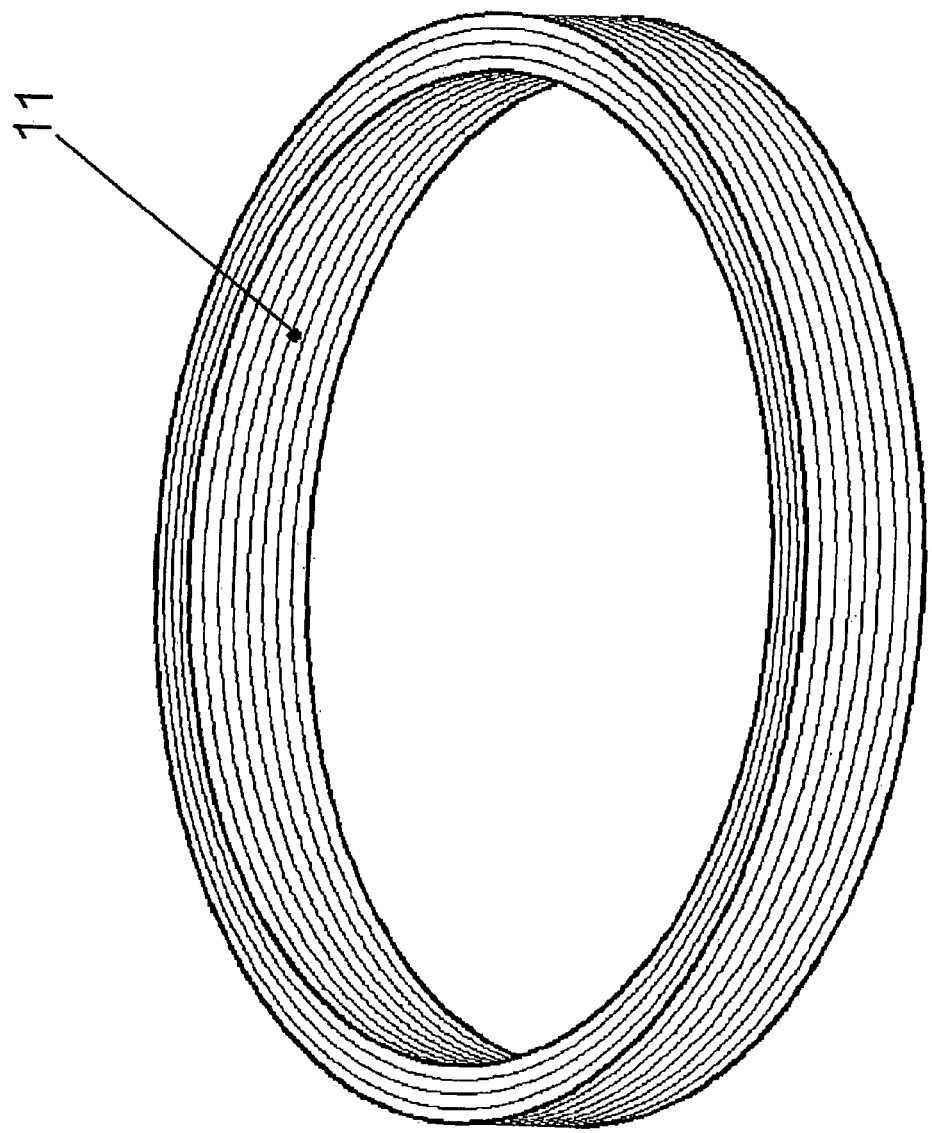
[FIG. 15]

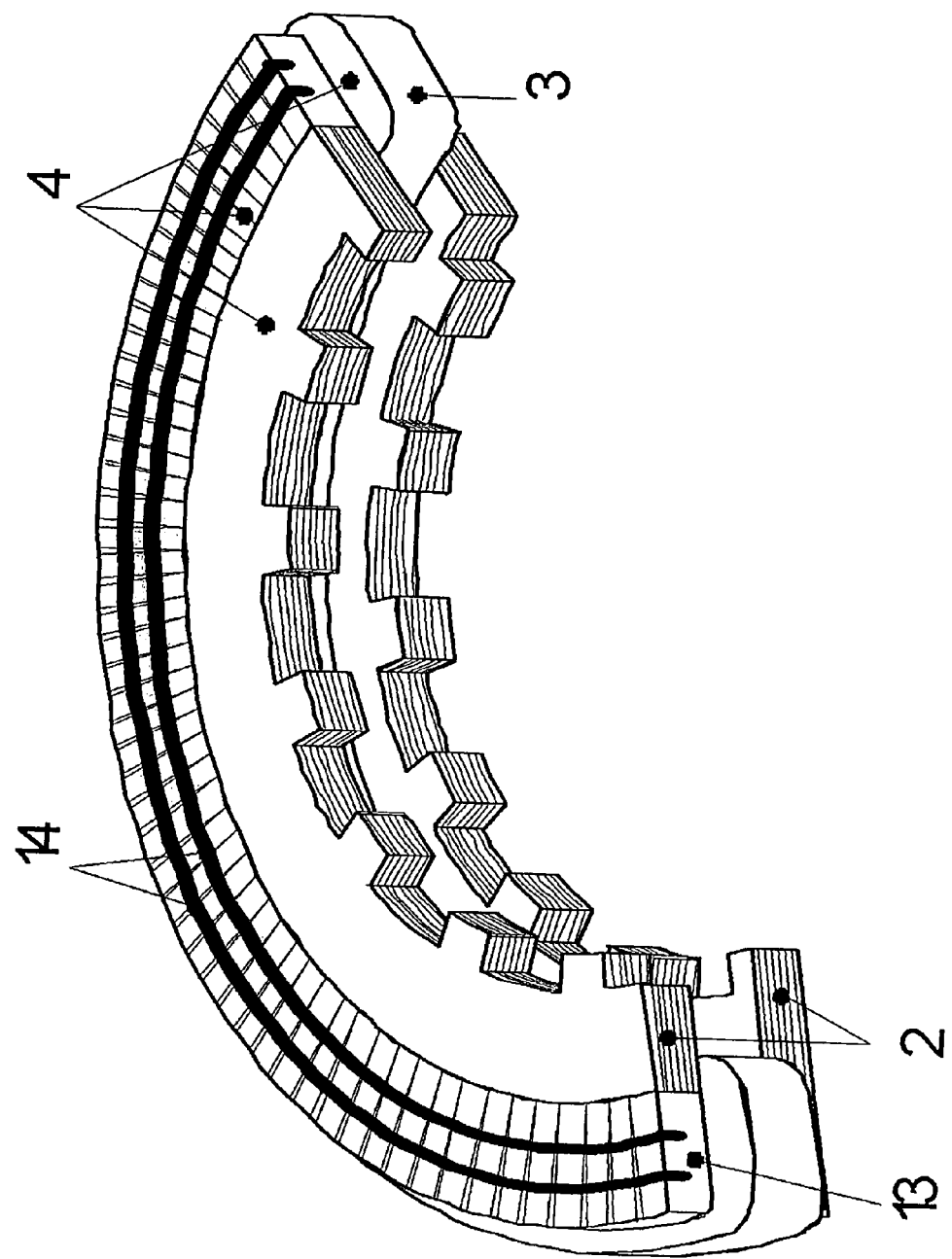
[FIG. 16]

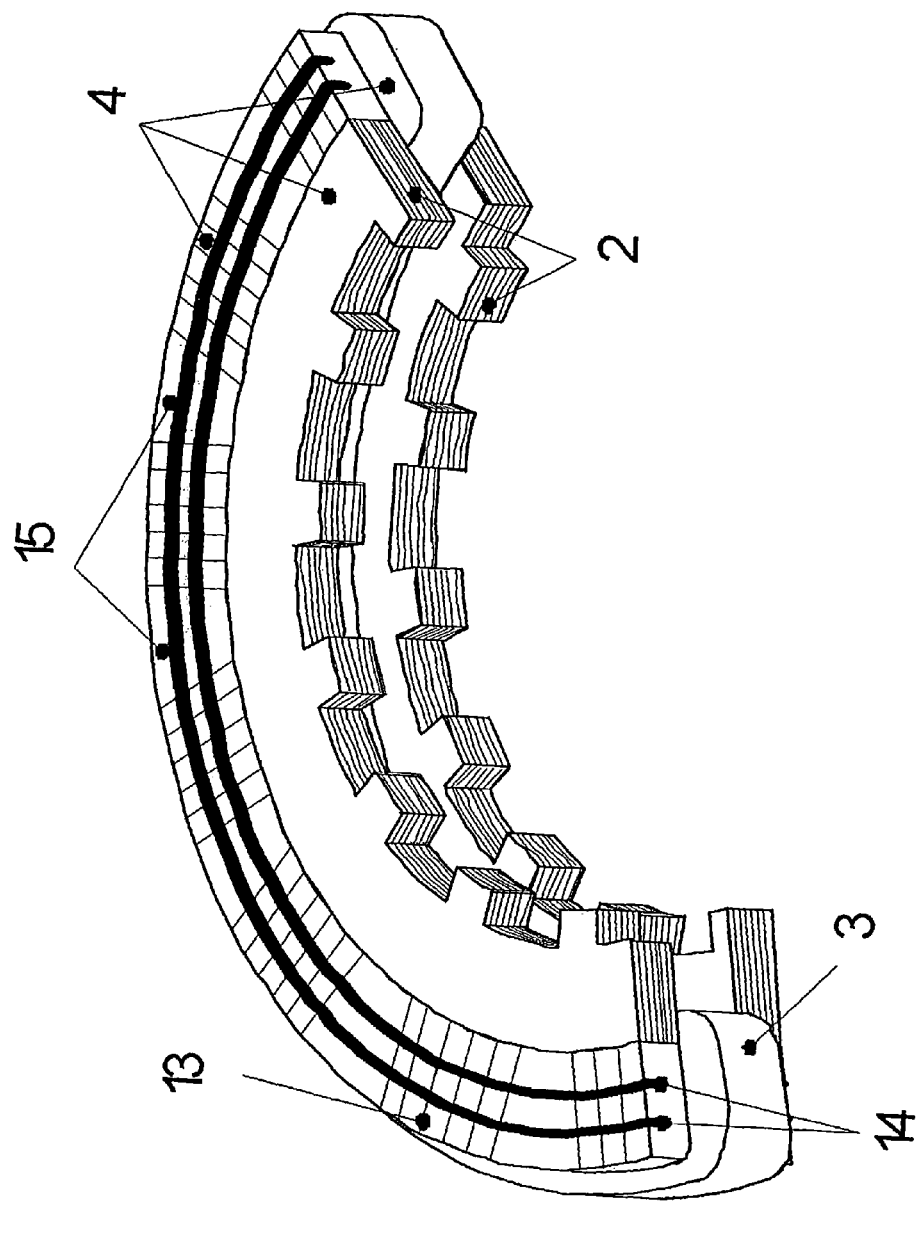

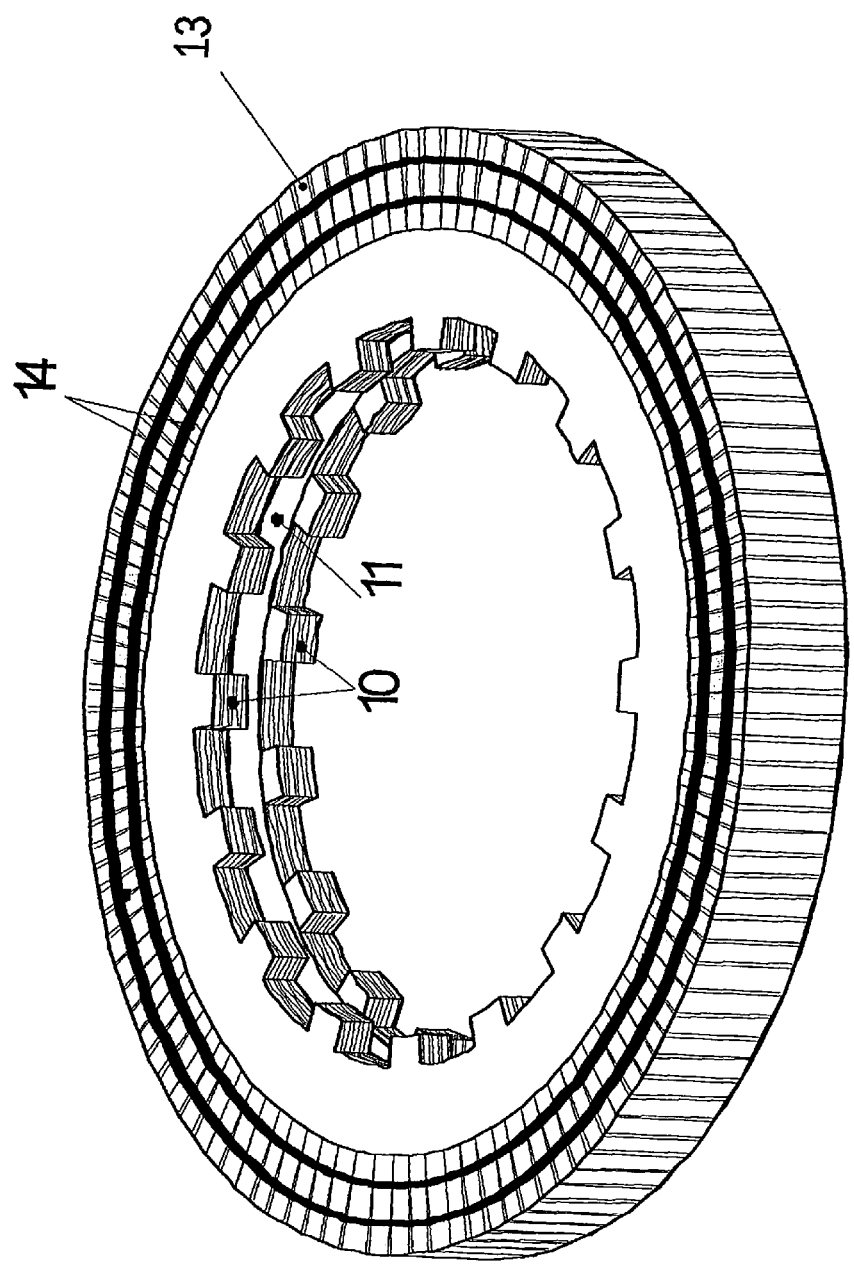
[FIG. 18]

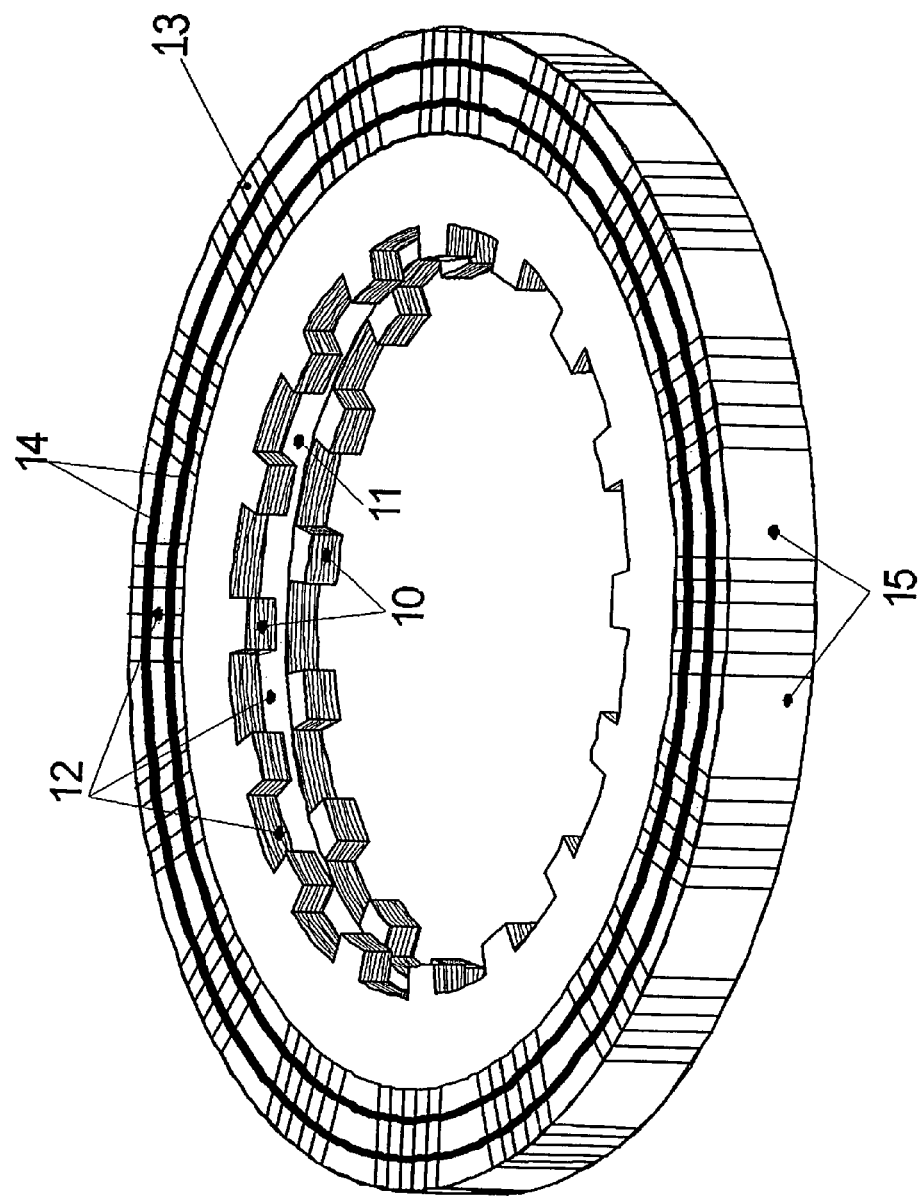
[FIG. 19]

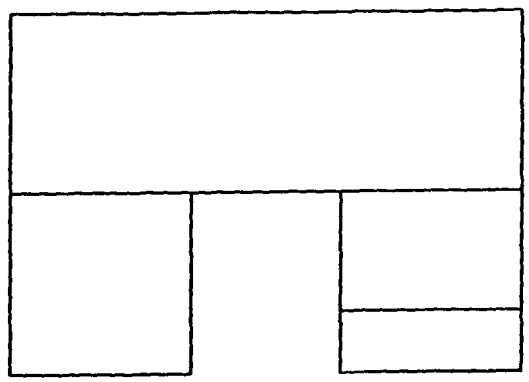
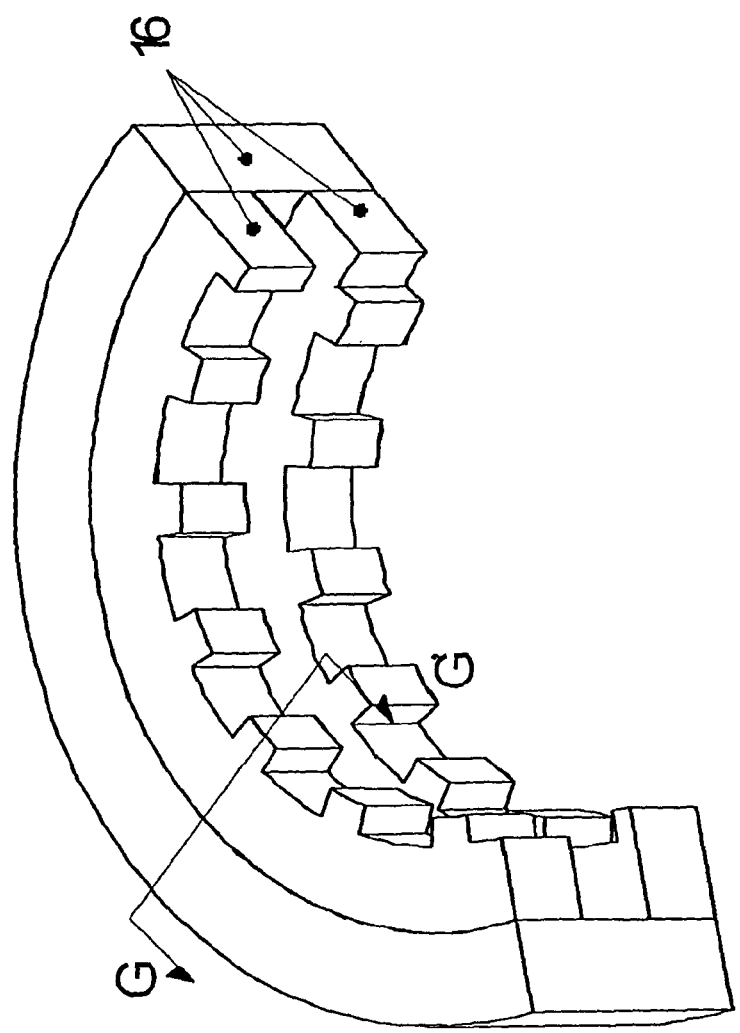
[FIG. 20a]

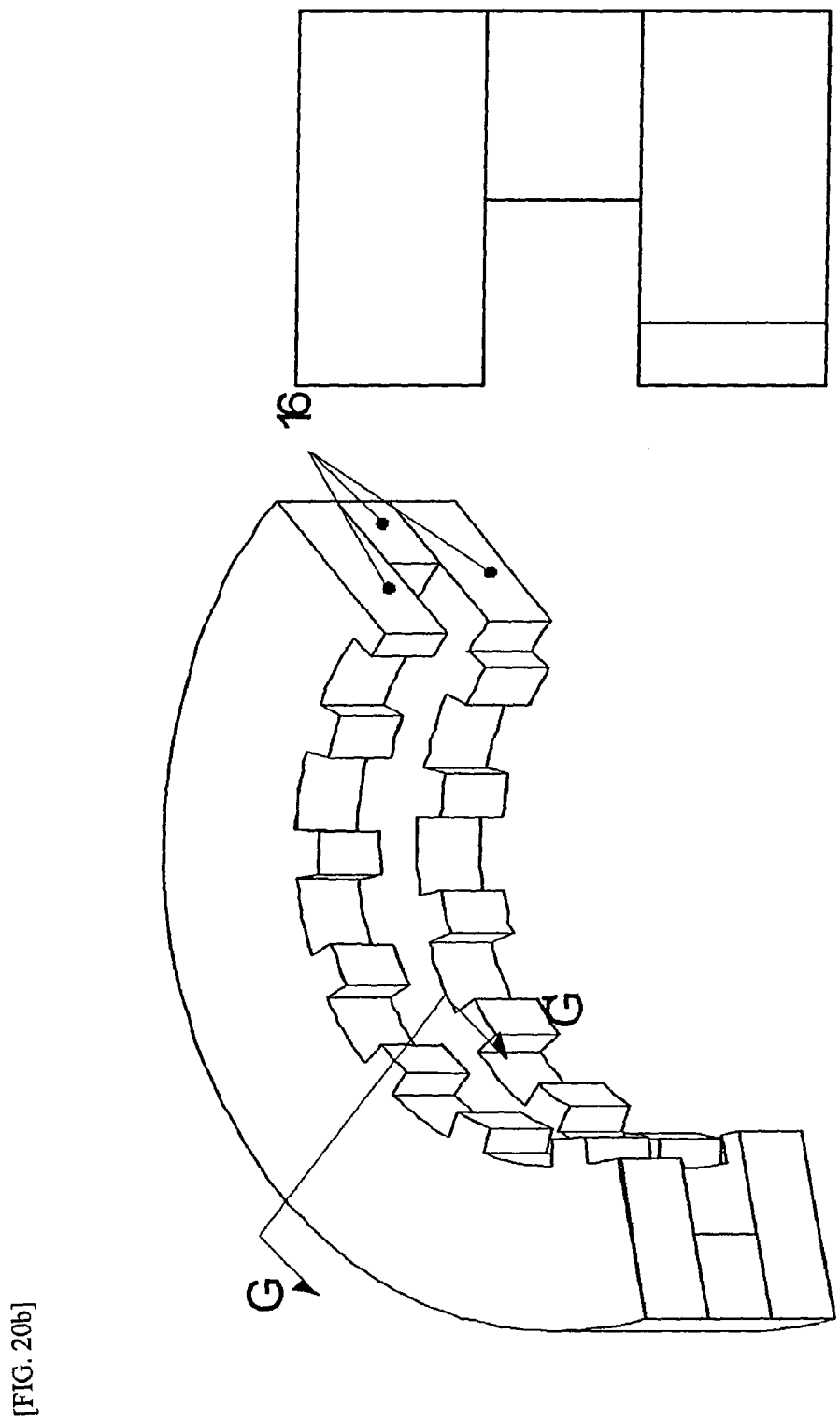
[FIG. 20b]

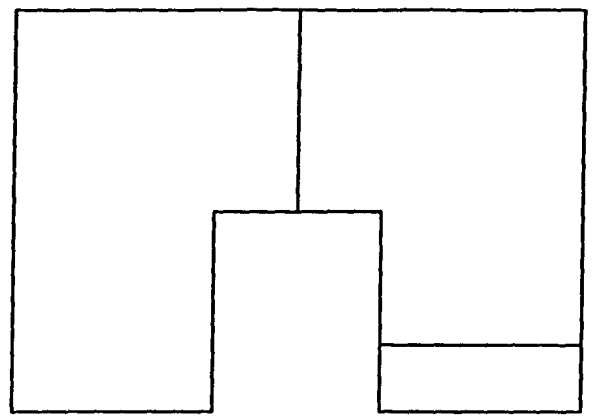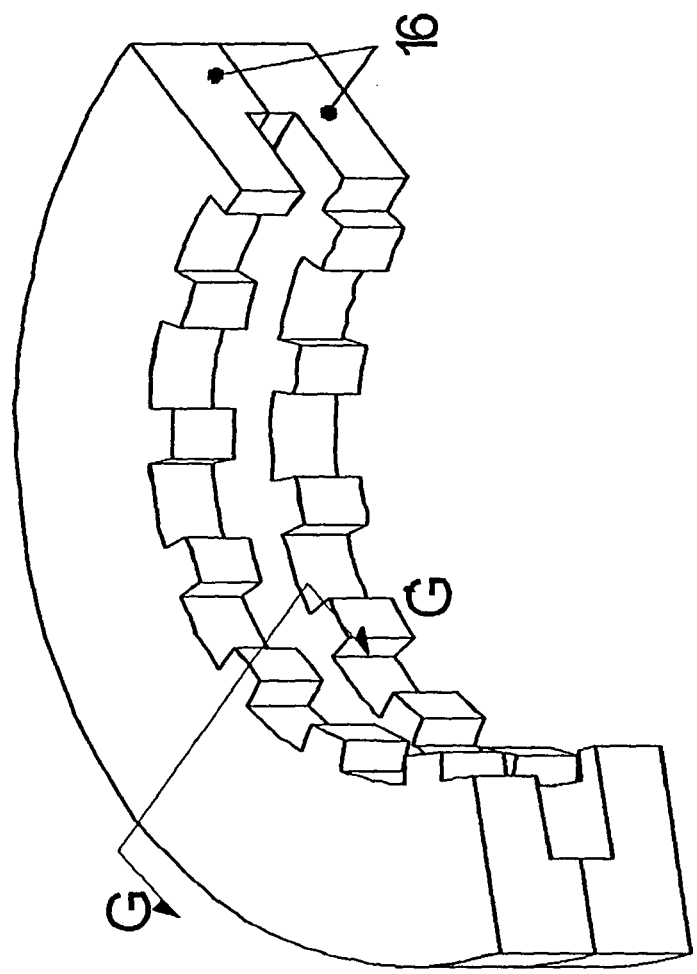
[FIG. 20c]

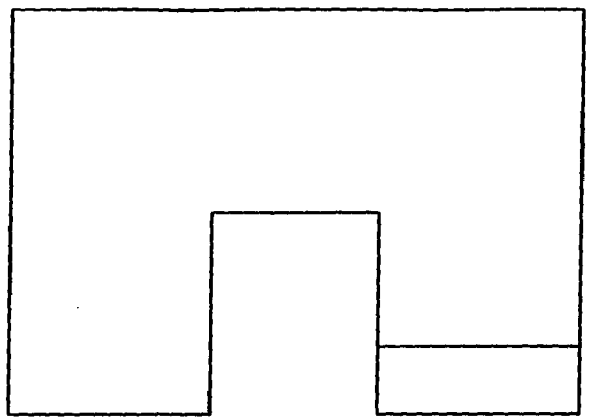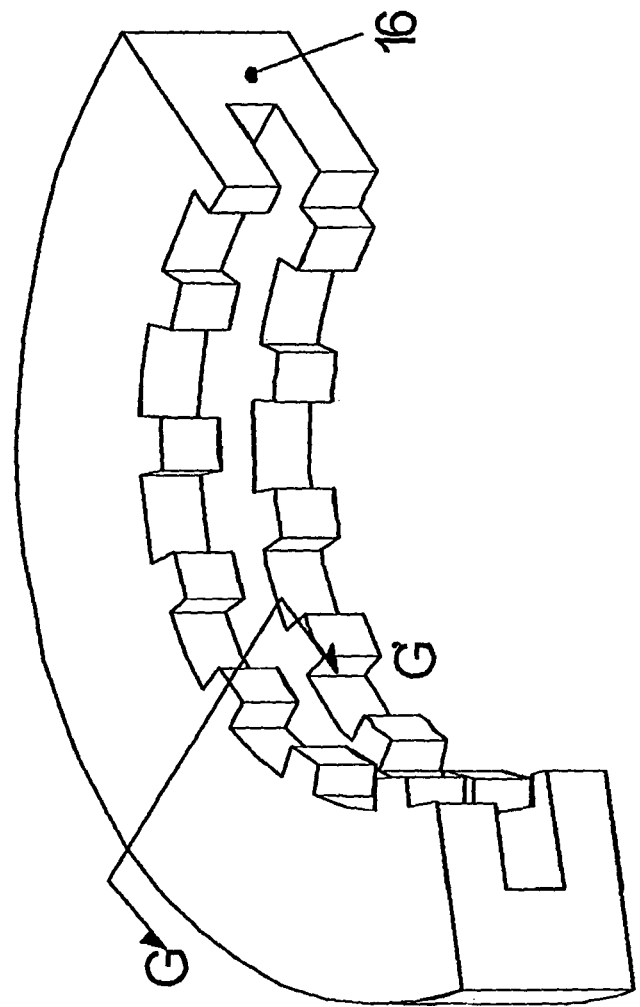
[FIG. 20d]

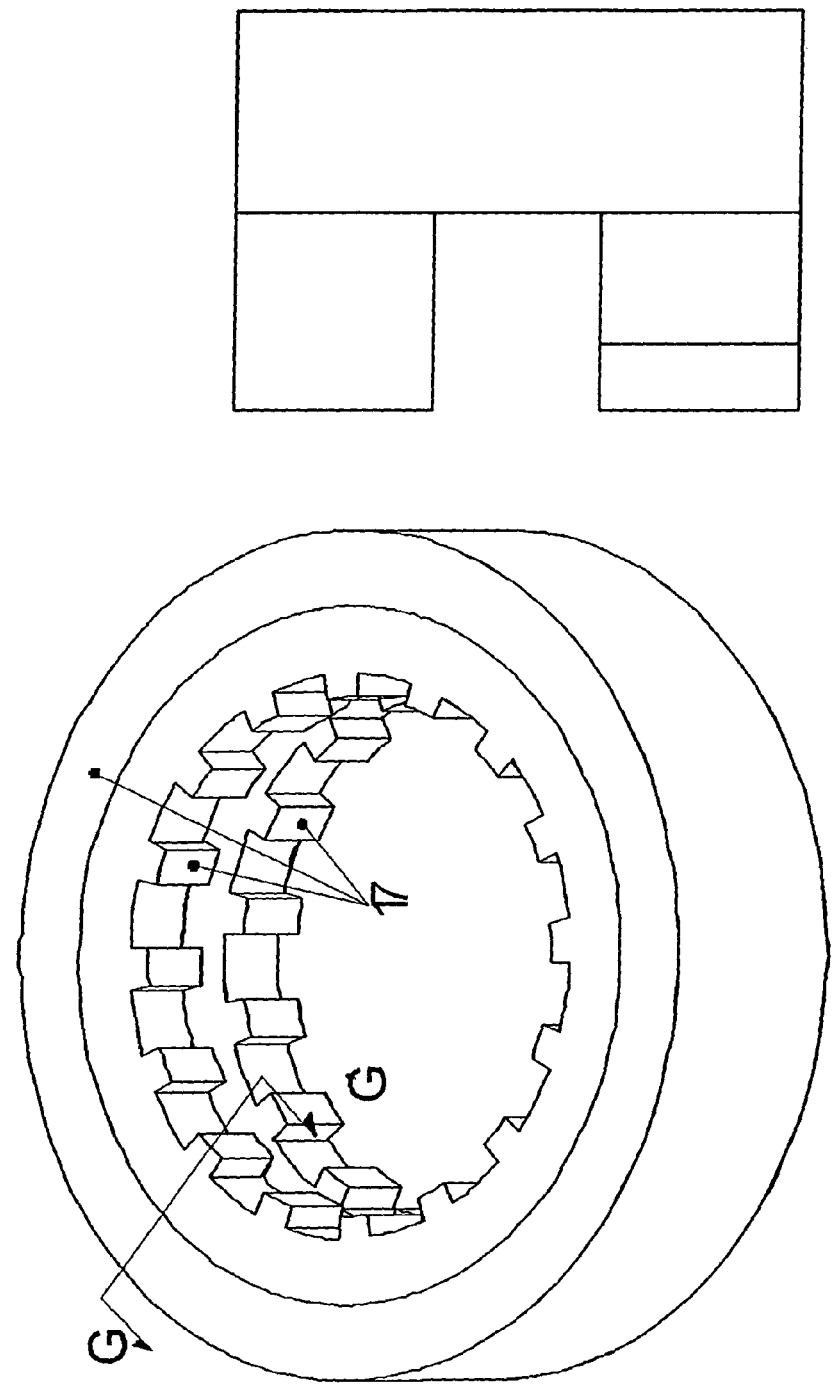
[FIG. 21a]

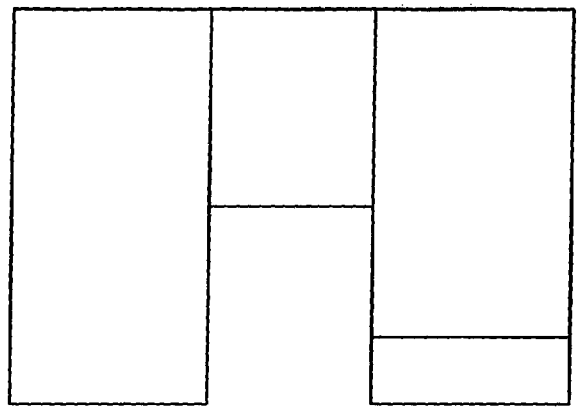
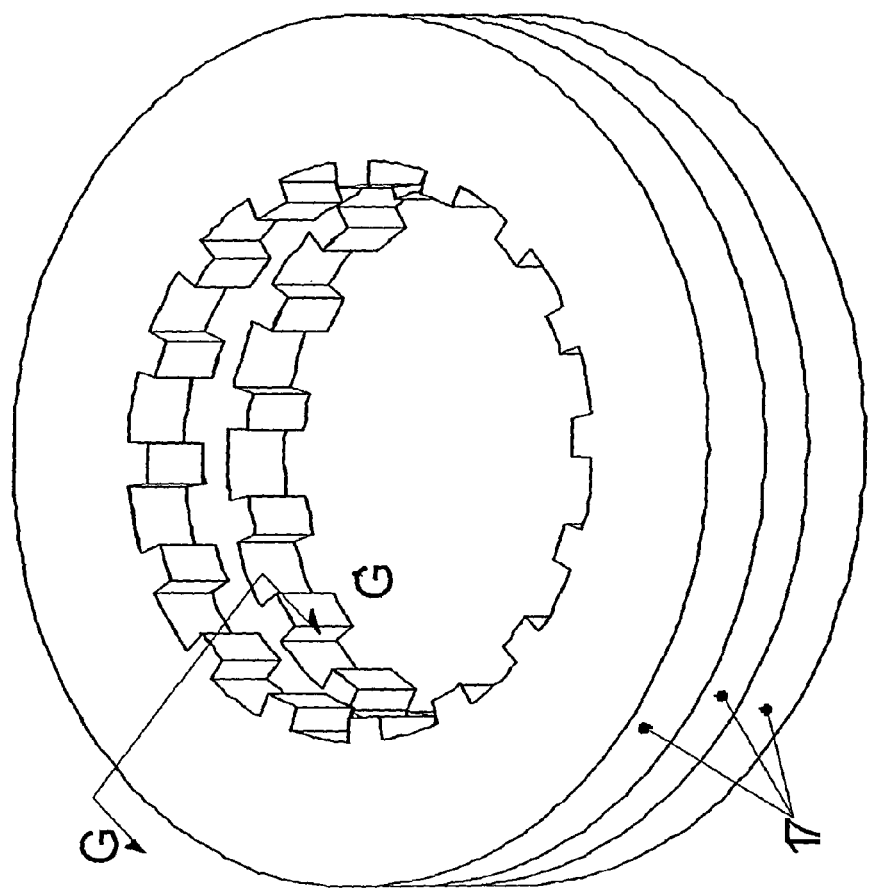
[FIG. 21b]

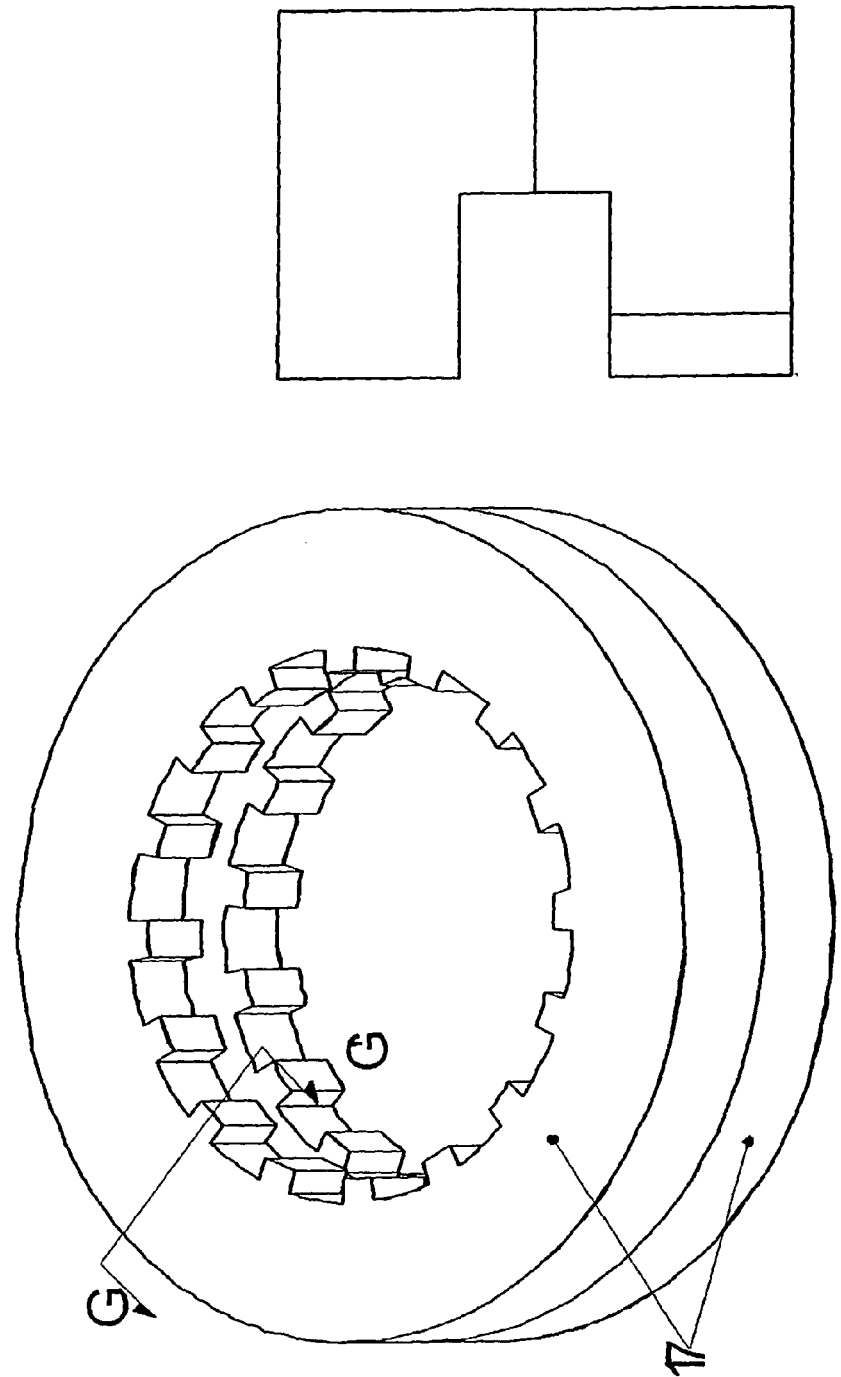
[FIG. 21c]

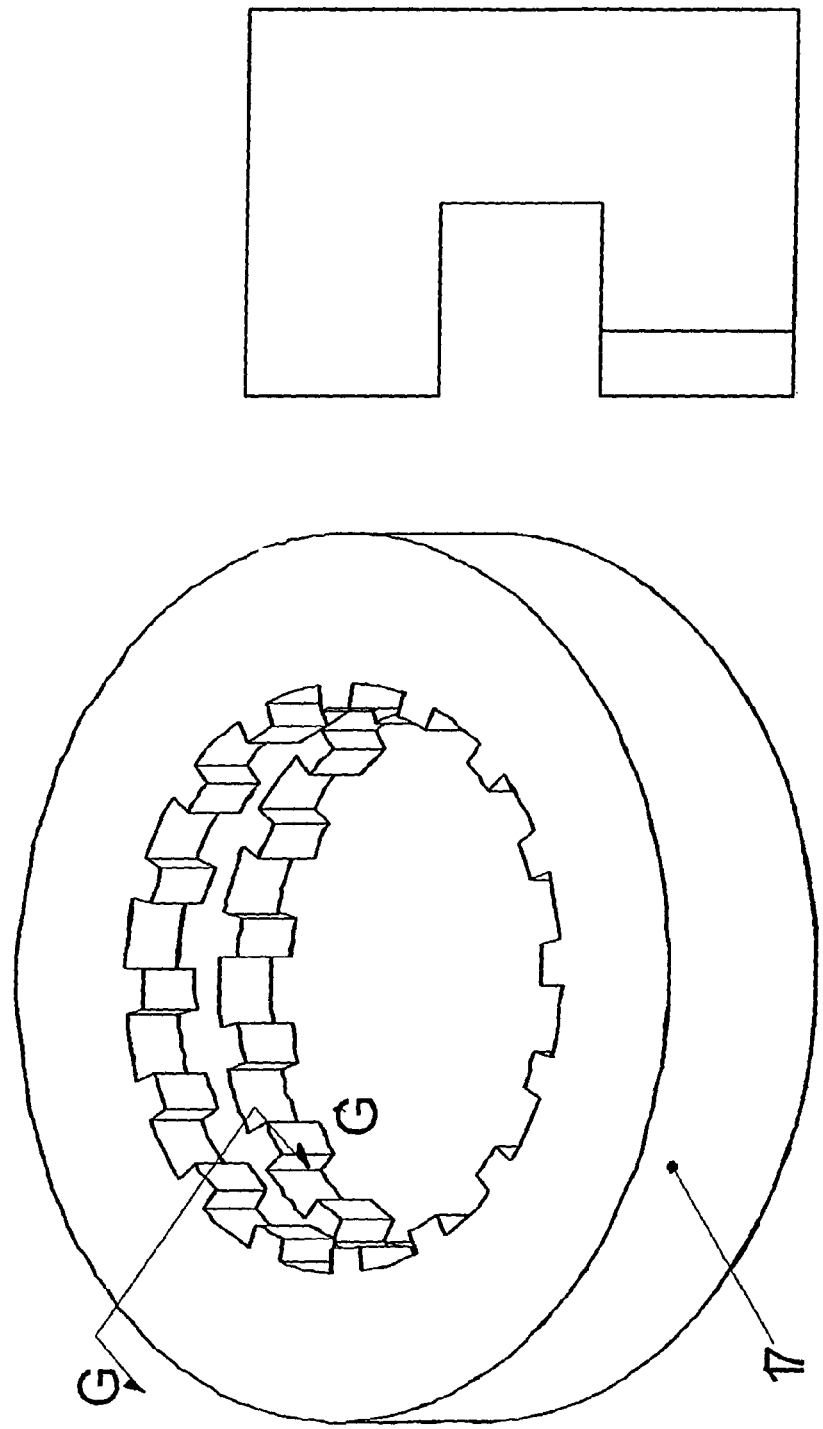
[FIG. 21d]

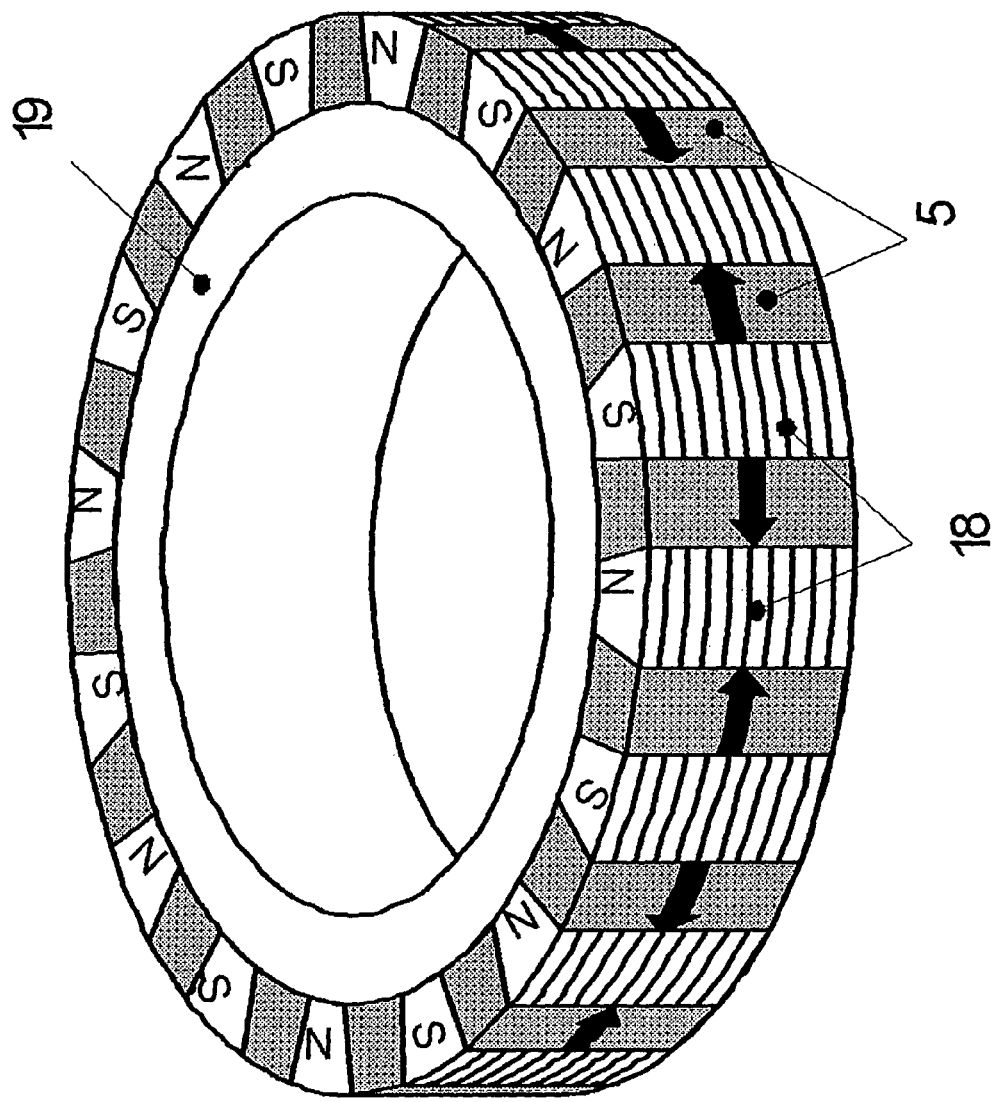
[FIG. 22]

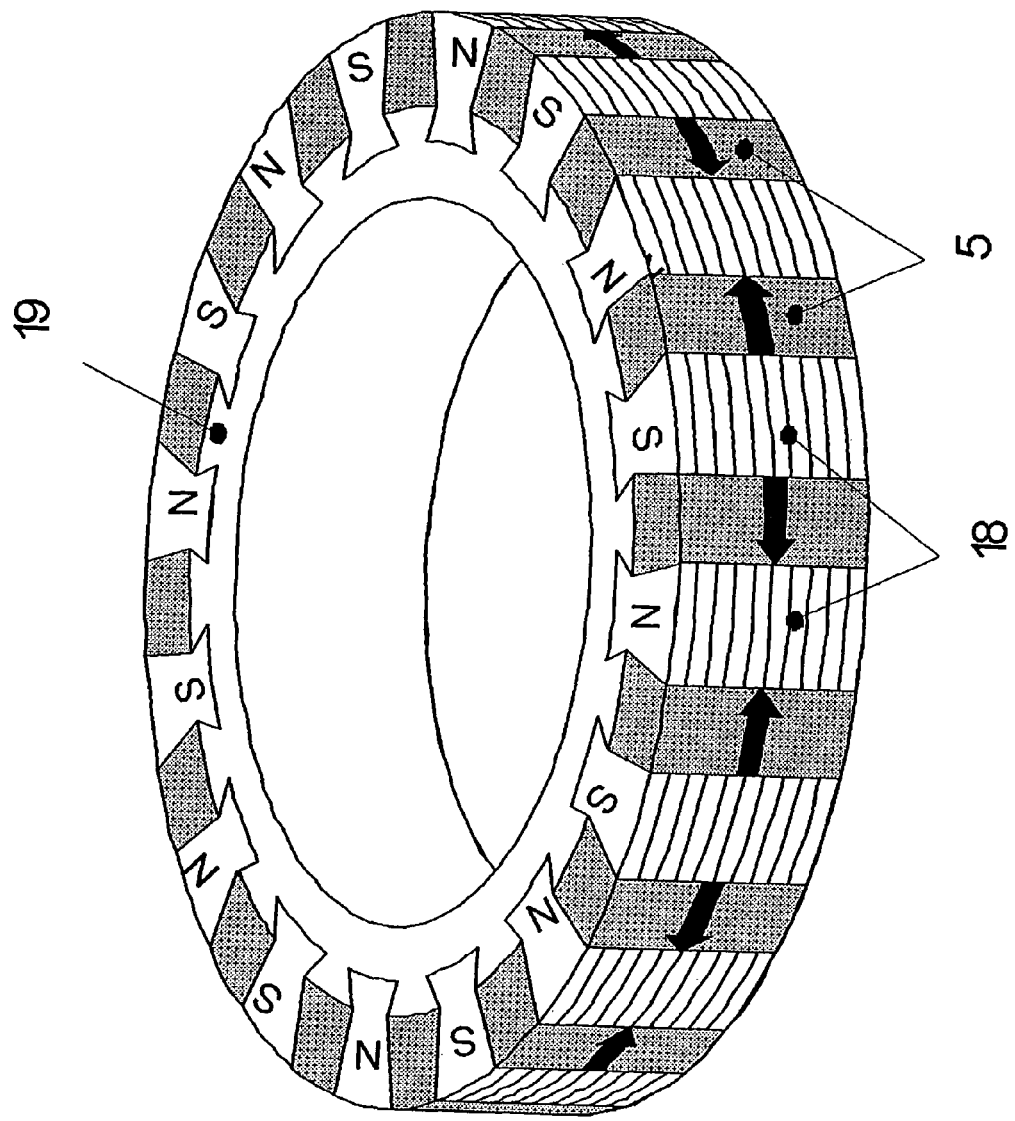
[FIG. 23]

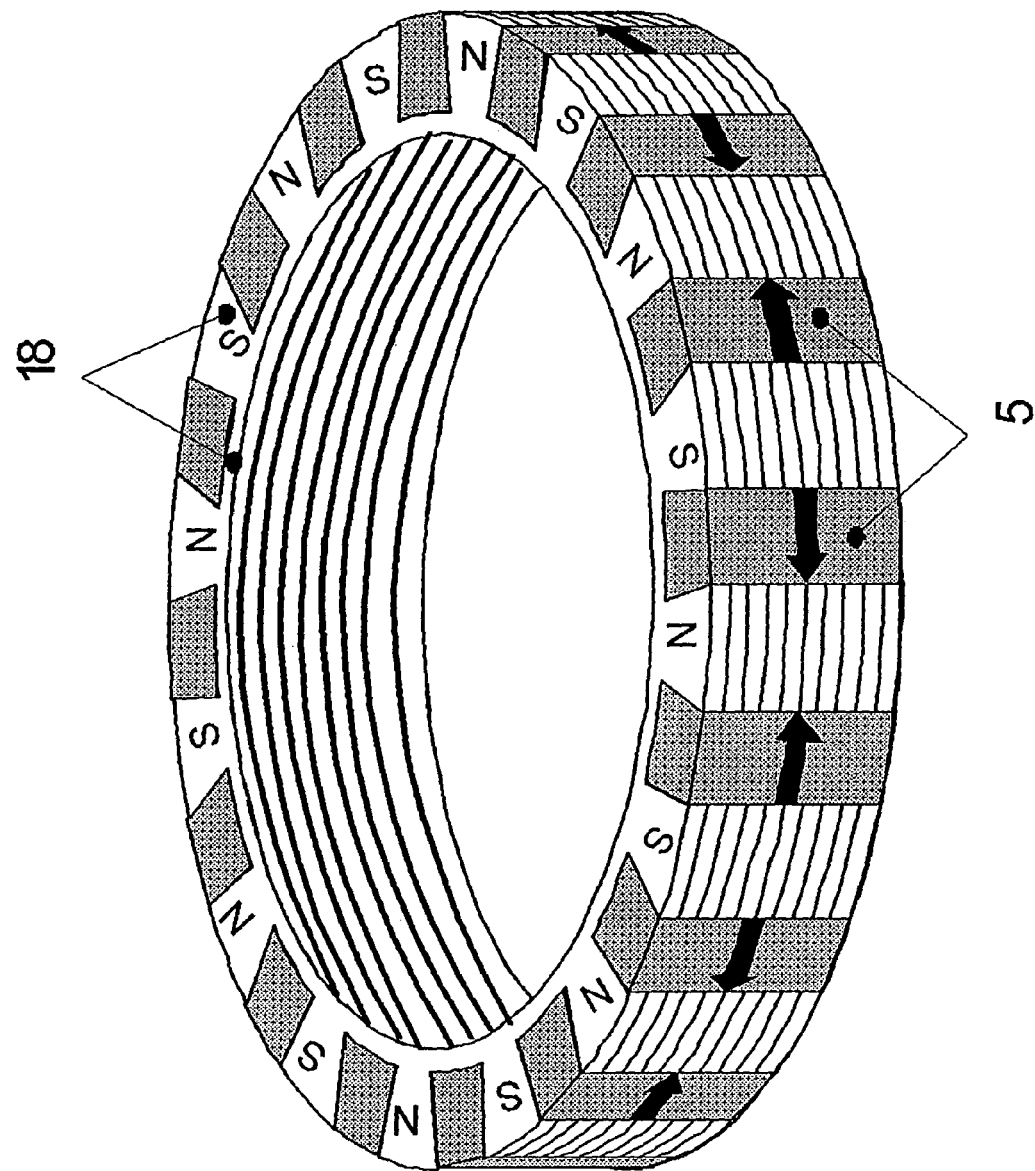
[FIG. 24]

INNER ROTOR TYPE PERMANENT MAGNET EXCITED TRANSVERSE FLUX MOTOR

CROSS-REFERENCE TO RELATED APPLICATION

This application claims the benefit of Korean Patent Application No. 10-2006-0135779, filed on Dec. 28, 2006, the entire disclosure of which is hereby incorporated by reference.

BACKGROUND OF THE INVENTION

1. Field of the Invention

The present invention relates to an inner rotor type permanent magnet excited transverse flux motor and, more particularly, to an inner rotor type permanent magnet excited transverse flux motor, in which a laminated structure in an axial direction or in a radial shape is applied to a stator iron core so as to employ a small amount of permanent magnets compared with a conventional outer rotor type permanent magnet excited transverse flux motor, thus providing high output power, increasing the efficiency of power generation, and reducing noise and vibration.

2. Description of Related Art

In general, a motor is a device that converts electrical energy into mechanical energy and basically requires high output power (output power/motor weight: kW/kg) and high efficiency (output power/input power).

Such motors can be classified into a longitudinal flux motor and a transverse flux motor according to the direction of a magnetic flux. In the longitudinal flux motor, the direction of an applied current is perpendicular to the moving direction of the motor such that the magnetic flux is produced on a section parallel to the moving direction. Whereas, in the transverse flux motor, the direction of an applied current coincides with the moving direction of the motor such that the magnetic flux is generated on a section crossing the moving direction.

In the transverse flux motor, a space (electrical circuit) in which a winding can be performed is separated from a space (magnetic circuit) in which a magnetic flux can flow. Accordingly, the transverse flux motor can increase the output power density and provide a variety of designs, compared with the longitudinal flux motor in which the electrical circuit and the magnetic circuit occupy the same space.

Moreover, the transverse flux motor has an advantage in that the overall size of the motor and the amount of copper used therein can be reduced, since the winding is carried out in the form of a ring, compared with the longitudinal flux motor in which an end-winding provided at both ends of the motor occupies a lot of volume.

However, the conventional transverse flux motor has problems in that, since it has a three-dimensional magnetic flux flow, it is not easy to manufacture the same, compared with the longitudinal flux motor, and it is difficult to adopt a laminated structure suitable for the three-dimensional magnetic flux flow, and such problems arise in a linear motor rather than a rotary motor.

SUMMARY OF THE INVENTION

Accordingly, the present invention has been made in an effort to solve the above-described problems, and an object of the present invention is to provide an inner rotor type permanent magnet excited transverse flux motor, in which a powdered iron core press-molded using a mold and a laminated structure in an axial direction or in a radial shape are applied to stator and rotor iron cores, thus facilitating the production of a transverse flux motor, reducing iron loss, increasing output power and efficiency, and reducing noise and vibration.

In an aspect, the present invention provides an inner rotor type permanent magnetic excited transverse flux motor comprising: a pair of segmented stators arranged to face each other and including a segmented stator powdered iron core press-molded using a mold, a segmented stator laminated iron core, and a segmented stator winding; and a rotor including a rotor permanent magnet and a rotor powdered iron core.

In a preferred embodiment, the segmented stator powdered iron core of the segmented stator has a fan shape, the segmented stator laminated iron core is positioned on upper and lower layers of the inside of the segmented stator powdered iron core at regular intervals, and the segmented stator winding which winds the segmented stator powdered iron core in which a current flows is wound between the intervals.

Preferably, projections corresponding to the teeth of the motor are arranged inside the segmented stator laminated iron core along the circumferential direction thereof at regular intervals ($\tau$), and the projection of the upper layer portion and the projection of the lower layer portion are arranged alternately at intervals of $\tau$ or $2\tau$, thus generating a propulsive force in one direction.

Suitably, the segmented stator powdered iron core and the segmented stator laminated iron core, positioned above a horizontal reference line, constitute an A-phase stator, and the segmented stator powdered iron core and the segmented stator laminated iron core, positioned beneath the horizontal reference line, constitute a B-phase stator, such that the pair of the segmented stators arranged to face each other constitute a 2-phase segmented stator, in which the start point of the A-phase stator has a difference of a in the clockwise direction with reference to the horizontal reference line and the start point of the B-phase stator has a difference of $\alpha+0.5\tau$ with reference to the horizontal reference line.

Moreover, the rotor permanent magnet and the rotor powdered iron core constituting the rotor are arranged alternately to face each other.

Furthermore, the segmented stator has a multiphase structure including 2-phase to N-phase segment stators.

In addition, in the multiphase structure, the segmented stators are moved by $$\frac{1}{N}\tau$$

in the clockwise direction with respect to a reference line based on a 1-phase segmented stator such that an N-phase segmented stator is moved by $$\frac{N-1}{N}\tau$$

in the clockwise direction with respect to the reference line.

In another aspect, the present invention provides an inner rotor type permanent magnetic excited transverse flux motor comprising: a ring-shaped stator including a ring-shaped stator powdered iron core, a ring-shaped stator laminated iron core, and a ring-shaped stator winding disposed inside the ring-shaped stator powdered iron core and having a multilayer structure wound on the inner circumference of the ring-shaped laminated iron core; and a rotor including a rotor permanent magnet and a rotor powdered iron core.

In a preferred embodiment, N number of ring-shaped stators are stacked in the axial direction of the rotor, and the length of the rotor is determined according to the number of the ring-shaped stators.

Preferably, in the arrangement of the ring-shaped stators, the ring-shaped stators are rotated by $$\frac{1}{N}\tau$$

with respect to a reference line based on a 1-phase ring-shaped stator such that an N-phase ring-shaped stator is rotated by $$\frac{N-1}{N}\tau$$

with respect to the reference line.

Suitably, the ring-shaped stator laminated iron core has a laminated structure in a direction perpendicular to a direction in which a magnetic flux flows so as to reduce iron loss, and upper and lower layer portions of the ring-shaped stator laminated iron core are skewed from each other by τ spatially, which is a half of a cycle, if the cycle is 2τ, thus generating a thrust force in one direction.

Moreover, the ring-shaped stator laminated iron core comprises a plurality of radial shape laminated iron cores connected by a fixing pin to constitute the fan-shaped or ring-shaped stator.

Furthermore, the plurality of radial shape laminated iron cores are arranged in the module unit at regular intervals and a spacer of a non-magnetic material is inserted between the modules.

In addition, the ring-shaped stator laminated iron core is made of a powdered iron core.

Additionally, the ring-shaped stator laminated iron core is made of a powdered iron core formed integrally with the ring-shaped stator powdered iron core.

Moreover, the upper and lower layer portions of the ring-shaped stator laminated iron core comprise two stator complete powdered iron cores.

Furthermore, the upper and lower layer portions of the ring-shaped stator laminated iron core comprise one stator complete powdered iron core.

In addition, in the event that the rotor powdered iron core is replaced with rotor laminated iron cores, the rotor permanent magnets and the rotor laminated iron cores are bonded or welded with a ring-shaped non-magnetic material 19 in the inner circumference thereof.

Additionally, a wedge shape formed at the inner circumference of the rotor laminated iron core is engaged with the non-magnetic material.

Moreover, in the event that the rotor powdered iron core is replaced with the rotor laminated iron cores, the rotor laminated iron cores are formed integrally and the rotor permanent magnets are inserted thereinto.

Furthermore, in the event that the rotor laminated iron cores are formed integrally, the iron core portion connecting the two adjacent laminated iron cores with the permanent magnet disposed therebetween should have a thickness that is sufficiently magnetized by the permanent magnet.

BRIEF DESCRIPTION OF THE DRAWINGS

FIG. 1 is a perspective view illustrating an inner rotor type permanent magnet excited transverse flux motor in accordance with a preferred embodiment of the present invention;

FIG. 2 is a perspective view illustrating a segmented stator of FIG. 1;

FIG. 3 is a perspective view illustrating a segmented stator powdered iron core and a segmented stator laminated iron core except for a segmented stator winding of FIG. 1;

FIG. 4 is a perspective view illustrating the segmented stator winding of FIG. 1;

FIG. 5 is a perspective view illustrating that the transverse flux motor of FIG. 1 is composed of a 2-phase segmented stator;

FIG. 6 is a plan view illustrating the 2-phase segmented stator of FIG. 5;

FIG. 7 is a perspective view illustrating a rotor of FIG. 1;

FIG. 8 is a cross-sectional view taken along line A-A' of FIG. 1;

FIGS. 9A and 9B are cross-sectional view, taken along lines C-C' and D-D' of FIG. 8, illustrating main magnetic fluxes, in which the current direction as shown in FIG. 8 is Ia+;

FIGS. 9C and 9D are cross-sectional view, taken along lines C-C' and D-D' of FIG. 8, illustrating main magnetic fluxes, in which the current direction opposite to the current direction of FIG. 8 is Ia−;

FIG. 10 is a perspective view illustrating segmented stators of a multiphase motor having a constant of at least 2 in accordance with another embodiment of the present invention;

FIG. 11 is a plan view illustrating the multiphase motor of FIG. 10;

FIG. 12 is a perspective view illustrating ring-shaped stators and a rotor of a multiphase motor in accordance with a further embodiment of the present invention;

FIG. 13 is an exploded perspective view illustrating how the ring-shaped stators of the multiphase motor of FIG. 12 are connected;

FIG. 14 is a perspective view illustrating a polarity arrangement of a 1-phase ring-shaped stator of FIG. 12;

FIG. 15 is a perspective view illustrating a winding of the 1-phase ring-shaped stator of FIG. 12;

FIG. 16 is a perspective view illustrating a segmented stator having radial shape laminated iron cores in accordance with a still further embodiment of the present invention;

FIG. 17 is a perspective view illustrating a segmented stator having a spacer disposed between the radial shape laminated iron cores of FIG. 16;

FIG. 18 is a perspective view illustrating a ring-shaped stator in which the radial shape laminated iron cores of FIG. 16 have a ring-shaped arrangement;

FIG. 19 is a perspective view illustrating a ring-shaped stator having a spacer disposed between the radial shape laminated iron cores of FIG. 16;

FIGS. 20A to 20D are diagrams illustrating various types classified according to assembly methods of a segmented stator composed of a complete powdered iron core;

FIGS. 21A to 21D are diagrams illustrating various types classified according to assembly methods of a ring-shaped stator composed of a complete powdered iron core;

FIG. 22 is a perspective view illustrating a rotor in which rotor permanent magnets and rotor laminated iron cores are welded with a ring-shaped non-magnetic material in accordance with the present invention;

FIG. 23 is a perspective view illustrating a rotor in which rotor permanent magnets and rotor laminated iron cores are inserted into a ring-shaped non-magnetic material in accordance with the present invention; and FIG. 24 is a perspective view illustrating a rotor in which rotor permanent magnets are inserted into rotor laminated iron cores in accordance with the present invention.

DETAILED DESCRIPTION OF THE INVENTION

Hereinafter, preferred embodiments in accordance with the present invention will be described with reference to the accompanying drawings. The preferred embodiments are provided so that those skilled in the art can sufficiently understand the present invention, but can be modified in various forms and the scope of the present invention is not limited to the preferred embodiments.

First, an inner rotor type permanent magnet excited transverse flux motor in accordance with a preferred embodiment of the present invention will be described with reference to FIGS. 1 to 9.

FIG. 1 is a perspective view illustrating an inner rotor type permanent magnet excited transverse flux motor with a segmented stator in accordance with a preferred embodiment of the present invention.

As shown in FIG. 1, the inner rotor type permanent magnet excited transverse flux motor generally comprises a segmented stator 4 and a rotor 7.

The segmented stator 4 includes a segmented stator powdered iron core 1 press-molded using a mold, a segmented stator laminated iron core 2, and a segmented stator winding 3, and the rotor 7 includes a rotor permanent magnet 5 and a rotor powdered iron core 6.

Especially, the inner rotor type permanent magnet excited transverse flux motor in accordance with the preferred embodiment of the present invention has a 2-phase structure in which a pair of segmented stators is arranged to face each other.

FIG. 2 is a perspective view illustrating a 1-phase segmented stator 4 of FIG. 1.

The segmented stator powdered iron core 1 has a fan shape and the segmented stator laminated iron core 2 is positioned on the upper and lower layers of the inside of the segmented stator powdered iron core 1 at regular intervals. The segmented stator winding 3 winding the segmented stator powdered iron core 1 in which a current flows is wound between the intervals.

FIG. 3 is a perspective view illustrating the segmented stator powdered iron core 1 and the segmented stator laminated iron core 2 except for the segmented stator winding 3.

The segmented stator powdered iron core 1 magnetically and mechanically connect an upper layer portion to a lower layer portion of the segmented stator laminated iron core 2.

Projections 2c and 2d corresponding to the teeth of the motor are arranged inside the segmented stator laminated iron core 2 along the circumferential direction thereof at regular intervals ($\tau$). In order to generate a propulsive force in one direction, the projection 2c of the upper layer portion and the projection 2d of the lower layer portion are arranged alternately at intervals of ($\tau$).

In this case, the segmented stator laminated iron core 2 has a laminated structure in a direction perpendicular to a direction in which the magnetic flux flows, i.e., in the axial direction, so as to reduce iron loss.

FIG. 4 is a perspective view illustrating the segmented stator winding 3 in the inner rotor type permanent magnet excited transverse flux motor in accordance with the preferred embodiment of the present invention.

The segmented stator winding 3 has a structure in which several layers are laminated and, as shown in FIGS. 1 and 2, the segmented stator winding 3 is arranged to wind the segmented stator powdered iron core 1, in which the inside portion thereof is positioned between the segmented stator laminated iron cores 2 positioned on the upper and lower layers of the inside of the segmented stator powdered iron core 1 at intervals.

As shown in FIG. 5, a 2-phase segmented stator is formed when two 1-phase segmented stators of FIG. 3, each including the segmented stator powdered iron core 1 and the segmented stator powdered laminated iron core 2, are arranged to face each other.

That is, the segmented stator iron cores 1 and 2 of FIG. 3 and the segmented stator winding 3 of FIG. 4 are combined to form the 1-phase segmented stator of FIG. 2 and, the 2-phase segmented stator of FIG. 5 and the segmented stator windings 3 of FIG. 4 are combined to constitute the 2-phase segmented stator in FIG. 1 of the inner rotor type permanent magnet excited transverse flux motor in accordance with the present invention.

FIG. 6 is a plan view illustrating the 2-phase segmented stator of FIG. 5 of the inner rotor type permanent magnet excited transverse flux motor in accordance with the present invention.

As illustrated in FIG. 6, the segmented stator powdered iron core 1 and the segmented stator laminated iron core 2, positioned above a horizontal reference line in the middle of the figure, constitute an A-phase stator, and the segmented stator powdered iron core 1 and the segmented stator laminated iron core 2, positioned beneath the horizontal reference line in the middle of the figure, constitute a B-phase stator.

In the 2-phase segmented stator 4, the start point of the A-phase stator has a difference of a in the clockwise direction with reference to the horizontal reference line and the start point of the B-phase stator has a difference of $\alpha+0.5\tau$ with reference to the horizontal reference line in order to obtain stable characteristics having little pulsation during the rotation of the rotor 7.

FIG. 7 is a perspective view illustrating the rotor 7 in the inner rotor type permanent magnet excited transverse flux motor in accordance with the present invention.

The rotor 7 has a structure in which the rotor permanent magnet 5 and the rotor powdered iron core 6 are arranged alternately and connected to each other.

In more detail, the rotor permanent magnets 5 adjacent to each other with the rotor powdered iron core 6 disposed therebetween have magnetic poles different from each other such that the rotor powdered iron cores 6 face each other as indicated by arrows in FIG. 7.

Accordingly, the magnetic fluxes generated from the rotor permanent magnets 5 are collected and thus the rotor powdered iron cores 6 have magnetic poles (N and S) alternately.

FIG. 8 is a cross-sectional view taken along line A-A' of FIG. 1, in which the section of the segmented stator 4 including the segmented stator powdered iron core 1, the segmented stator laminated iron core 2 and the segmented stator winding 3, the section of the rotor 7, and the relationship of the magnetic flux $\phi 8$ by a current are shown.

As shown in FIG. 8, when the current flows in the right coil section of the segmented stator winding 3 and flows out of the left coil section, the magnetic flux $\phi 8$ in the counterclockwise direction is produced around the circumference of the segmented stator winding 3.

At this time, the N pole is formed on the upper layer portion of the segmented stator laminated iron core 2 of the segmented stator 4 and the S pole is formed on the lower layer portion of the segmented stator laminated iron core 2 of the segmented stator 4.

Next, the operation principle of the inner rotor type permanent magnet excited transverse flux motor in accordance with the preferred embodiment of the present invention will be described.

FIGS. 9A to 9D are diagrams illustrating the mechanism of force generation in the inner rotor type permanent magnet excited transverse flux motor in accordance with the present invention.

FIGS. 9A and 9B shows the current direction of Ia+ if the current direction as shown in FIG. 8 is Ia+, and FIGS. 9C and 9D shows the current direction of Ia− if the current direction opposite to the current direction of FIG. 8 is Ia−.

FIG. 9A is a cross-sectional view, taken along line C-C' of FIG. 8, illustrating the mechanism of force generation in the upper layer portion of the segmented stator laminated iron core 2 and the rotor 7.

As shown in FIG. 9A, when the current is applied in the direction of Ia+, the magnetic flux ϕ8 is produced around the circumference of the segmented stator winding 3 and thus the N pole is formed on the upper layer portion of the segmented stator laminated iron core 2.

The magnetic poles formed in the rotor powdered iron cores 6 are determined by the arrangement of the permanent magnets. In the case where the magnetic poles of the permanent magnets 5 are arranged in the facing direction, like →←, the rotor powdered iron cores 6 disposed therebetween have the N pole. Whereas, in the case where the magnetic poles of the permanent magnets 5 are arranged in the opposite direction, like ←→, the rotor powdered iron cores 6 disposed therebetween have the S pole.

Accordingly, by the interaction between the magnetic poles (N and S) of the rotor 7 and the magnetic pole (N) of the upper layer portion of the segmented stator laminated iron core 2, attraction force $F_{ra1}$ is generated if the directions of the magnetic poles are different from each other, and repulsion force $F_{ra2}$ is generated if the directions of the magnetic poles are the same, thus generating force $F_{rr+}$ by the rotor 7.

FIG. 9B is a cross-sectional view, taken along line D-D' of FIG. 8, illustrating the mechanism of force generation in the upper layer portion of the segmented stator laminated iron core 2 and the rotor 7.

As shown in FIG. 9B, when the current is applied in the direction of Ia+, the magnetic flux ϕ8 is produced around the circumference of the segmented stator winding 3 and thus the S pole is formed on the lower layer portion of the segmented stator laminated iron core 2.

In the same manner, in the case where the magnetic poles of the permanent magnets 5 are arranged in the facing direction, like →←, the rotor powdered iron cores 6 disposed therebetween have the N pole. In the case where the magnetic poles of the permanent magnets 5 are arranged in the opposite direction, like ←→, the rotor powdered iron cores 6 disposed therebetween have the S pole.

Accordingly, by the interaction between the magnetic poles (N and S) of the rotor 7 and the magnetic pole (S) of the lower layer portion of the segmented stator laminated iron core 2, attraction force $F_{rb1}$ is generated if the directions of the magnetic poles are different from each other, and repulsion force $F_{rb2}$ is generated if the directions of the magnetic poles are the same, thus generating force $F_{r1+}$ by the rotor 7. Since the upper layer portion and the lower layer portion of the segmented stator laminated iron core 2 are skewed from each other by τ, the rotor 7 always generates a force in one direction.

FIG. 9C is a cross-sectional view, taken along line C-C' of FIG. 8, illustrating the mechanism of force generation in the upper layer portion of the segmented stator laminated iron core 2 and the rotor 7. However, since the current is applied in the direction of Ia−, the S pole is formed on the upper layer portion of the segmented stator laminated iron core 2, and force $F_{rr-}$ is generated by the rotor 7 by the force generation mechanism the same as that of FIG. 9B.

FIG. 9D is a cross-sectional view, taken along line D-D' of FIG. 8, illustrating the mechanism of force generation in the lower layer portion of the segmented stator laminated iron core 2 and the rotor 7. However, since the current is applied in the direction of Ia−, the N pole is formed on the lower layer portion of the segmented stator laminated iron core 2, and force $F_{r1-}$ is generated by the rotor 7 by the force generation mechanism the same as that of FIG. 9A.

Next, an inner rotor type permanent magnet excited transverse flux motor in accordance with another embodiment of the present invention will be described with reference to FIGS. 10 to 11.

FIG. 10 is a perspective view illustrating segmented stators of a multiphase motor having a constant of at least 2 in accordance with another embodiment of the present invention.

As shown in FIG. 10, the multiphase motor in accordance with another embodiment of the present invention has characteristics in which a plurality of 1-phase segmented stators 4, each including a segmented stator powdered iron core 1, a segmented stator laminated iron core 2 and a segmented stator winding 3 surrounding them, is provided in N-phase.

FIG. 11 is a plan view illustrating the multiphase motor having a constant of at least 2 of FIG. 10.

As described above with reference to FIG. 10, the respective phases are arranged in the rotational direction to have a phase difference in terms of space so as to reduce the pulsation during the rotation of the rotor 7.

That is, as shown in FIG. 11, the 2-phase segmented stator Phase-2 is moved by $$\frac{1}{N}\tau$$

in the clockwise direction with respect to a reference line based on the 1-phase segmented stator Phase-1, the 3-phase segmented stator Phase-3 is moved by $$\frac{2}{N}\tau$$

in the clockwise direction with respect to the reference line. Accordingly, the N-phase segmented stator Phase-N is moved by $$\frac{N-1}{N}\tau$$

in the clockwise direction with respect to the reference line.

Next, an inner rotor type permanent magnet excited transverse flux motor in accordance with a further embodiment of the present invention will be described with reference to FIGS. 12 to 15.

FIG. 12 is a perspective view illustrating an inner rotor type permanent magnet excited transverse flux motor in accordance with a further embodiment of the present invention.

As shown in FIG. 12, the inner rotor type permanent magnet excited transverse flux motor in accordance with a further embodiment of the present invention includes N number of ring-shaped stators 12 Phase-1 to Phase-N, and a rotor 7.

The ring-shaped stator 12 includes a ring-shaped stator powdered iron core 9, a ring-shaped stator laminated iron core 10, and a ring-shaped stator winding 11 shown in FIG. 14, and the rotor 7 includes a rotor permanent magnet 5 and a rotor powdered iron core 6.

Differently from the segmented stators of FIG. 1 in accordance with the preferred embodiment of the present invention, the inner rotor type permanent magnet excited transverse flux motor in accordance with a further embodiment of the present invention employs the ring-shaped stators, in which the attraction force and the rotational force acting on the rotor 7 are symmetrical spatially with respect to an axis, thus reducing the generated noise.

Moreover, since the ring-shaped stator winding 11 of the inner rotor type permanent magnetic excited transverse flux motor having the ring-shaped stator 12 surrounds the ring-shaped stator powdered iron core 9, it is easy to wind the ring-shaped stator winding 11 and a small amount of material is required.

In this case, the inner rotor type permanent magnetic excited transverse flux motor has N number of ring-shaped stators 12 in the axial direction of the rotor 7 so as to reduce the pulsation of thrust force, and the length of the rotor 7 is determined according to the number of the ring-shaped stators 12.

The cross-sectional view taken along line F-F' of the motor having the ring-shaped stators of FIG. 12 is similar to that of FIG. 8 taken along line A-A' of the motor having the segmented stators of FIG. 1, and the mechanisms of magnetic flux generation and force generation are the same.

Only a difference is that there is not provided the ring-shaped stator winding 11 at the outside of the stator corresponding to the right section of the segmented stator winding 3 of FIG. 8.

FIG. 13 is an exploded perspective view illustrating how the N number of ring-shaped stators Phase-1 to Phase-N of the multiphase motor of FIG. 12 is connected. The multiphase motor in accordance with the present embodiment is characterized in that the ring-shaped stator powdered iron core 9, the ring-shaped stator laminated iron core 10, and the ring-shaped stator winding 11 constitute one ring-shaped stator 12, and N number of ring-shaped stators 12 is required to form the Phase-N.

When assembling the N number of ring-shaped stators 12 in the axial direction, the ring-shaped stators 12 have a constant phase difference in terms of space so as to reduce the pulsation during the rotation of the rotor 7.

That is, as shown in FIG. 13, the 2-phase ring-shaped stator Phase-2 is mechanically rotated by $$\frac{1}{N}\tau$$

with respect to a reference line based on the 1-phase ring-shaped stator Phase-1, and thus the N-phase ring-shaped stator Phase-N is mechanically rotated by $$\frac{N-1}{N}\tau$$

with respect to the reference line.

FIG. 14 is a perspective view illustrating the ring-shaped stator 12 of FIG. 13 comprising the ring-shaped stator powdered iron core 9, the ring-shaped stator laminated iron core 10, and the ring-shaped stator winding 11.

In more detail, the ring-shaped stator laminated iron core 10 has a laminated structure in a direction perpendicular to a direction in which the magnetic flux flows, i.e., in the axial direction, so as to reduce iron loss. Especially, upper and lower layer portions 10a and 10b of the ring-shaped stator laminated iron core 10 are skewed from each other by $\tau$ spatially, which is a half of a cycle, if the cycle is $2\tau$, thus generating the thrust force in one direction.

FIG. 15 is a perspective view illustrating the ring-shaped stator winding 11 disposed between the upper and lower layer portions 10a and 10b of the ring-shaped stator laminated iron core 10 of FIG. 14, in which the ring-shaped stator winding 11 has a multilayer structure wound on the inner circumference of the ring-shaped stator powdered iron core 9.

FIG. 16 is an exemplary diagram illustrating a segmented stator having radial shape laminated iron cores 13 in a rectangular parallelepiped shape in accordance with a still further embodiment of the present invention, instead of the segmented stator powdered iron core 1 in the segmented stator 4 of FIG. 2.

As shown in FIG. 16, the radial shape laminated iron cores 13 have a modified structure capable of utilizing the existing laminated iron core compared with the structure of the segmented stator powdered iron core 1, in which a fixing pin 14 is attached to integrally fix the plurality of radial shape laminated iron cores 13.

FIG. 17 is an exemplary diagram illustrating a structure modified from that of FIG. 16 in view of processability, in which radial shape laminated iron cores 13 are arranged in the module unit at regular intervals and a spacer 15 of a non-magnetic material is inserted between the modules.

The spacer 15 is molded between the modules of the radial shape laminated iron cores at regular intervals to firmly support the stator. In the same manner, a fixing pin 14 is attached to fix the radial shape laminated iron cores 13 and the spacer 15.

FIG. 18 is an exemplary diagram illustrating that the ring-shaped stator powdered iron core 9 in the ring-shaped stator 12 of FIG. 12 is replaced with the radial shape laminated iron cores 13, in which the radial shape laminated iron cores 13 are connected by a fixing pin 14 to constitute the ring-shaped stator 12 of FIG. 12.

FIG. 19 is an exemplary diagram illustrating that the ring-shaped stator powdered iron core 9 in the ring-shaped stator 12 of FIG. 12 is replaced with the radial shape laminated iron cores 13 and the spacers 15, in which the radial shape laminated iron cores 13 and the spacers 15 are connected by a fixing pin 14 to constitute the ring-shaped stator 12 of FIG. 12.

FIGS. 20A to 20D are exemplary diagrams illustrating various types of segmented stator complete powdered iron cores 16 in which the segmented stator powdered iron core 1 and the segmented stator laminated iron core 2 of FIG. 3 are all made of powder. Since the segmented stator complete powdered iron core 16 is formed by press-molding powders using a mold, the manufacturing process is simplified with various types as shown in FIGS. 20A to 20D.

That is, FIG. 20A is a perspective view illustrating that the segmented stator laminated iron core 2 of FIG. 3 is replaced with the segmented stator complete powdered iron core 16, and a cross-sectional view taken along line G-G', in which the segmented stator complete powdered iron core 16 is composed of three blocks divided in the radial direction with respect to the 1-phase segmented stator. FIG. 20B is a perspective view illustrating that the segmented stator laminated iron core 2 is replaced with the segmented stator complete powdered iron core 16 formed integrally with the segmented stator powdered iron core 1, and a cross-sectional view taken along line G-G', in which the segmented stator complete powdered iron core 16 is composed of three blocks divided in the up and down direction with respect to the 1-phase segmented stator.

FIG. 20C is a perspective view illustrating that the segmented stator laminated iron core 2 is replaced with the segmented stator complete powdered iron core 16 formed integrally with the segmented stator powdered iron core 1 and divided into upper and lower layer portions, and a cross-sectional view taken along line G-G', in which the segmented stator complete powdered iron core 16 is composed of two blocks divided in the up and down direction with respect to the 1-phase segmented stator. FIG. 20D is a perspective view illustrating that the segmented stator laminated iron core 2 is formed integrally with the segmented stator powdered iron core 1, and a cross-sectional view taken along line G-G', in which the segmented stator complete powdered iron core 16 is composed of an integrated block.

FIGS. 21A to 21D are exemplary diagrams illustrating various types of ring-shaped stator complete powdered iron cores 17 in which the ring-shaped stator powdered iron core 9 and the ring-shaped stator laminated iron core 10 of FIG. 12 are all made of powder. Since the ring-shaped stator complete powdered iron core 17 is formed by press-molding powders using a mold, the manufacturing process is simplified with various types as shown in FIGS. 21A to 21D.

That is, FIG. 21A is a perspective view illustrating that the ring-shaped stator laminated iron core 10 of FIG. 12 is replaced with the ring-shaped stator complete powdered iron core 17, and a cross-sectional view taken along line G-G', in which the ring-shaped stator complete powdered iron core 17 is composed of three blocks divided in the radial direction with respect to the 1-phase ring-shaped stator. FIG. 21B is a perspective view illustrating that the ring-shaped stator laminated iron core 10 is replaced with the ring-shaped stator complete powdered iron core 17 formed integrally with the ring-shaped stator powdered iron core 9, and a cross-sectional view taken along line G-G', in which the ring-shaped stator complete powdered iron core 17 is composed of three blocks divided in the up and down direction with respect to the 1-phase ring-shaped stator. FIG. 21C is a perspective view illustrating that the ring-shaped stator laminated iron core 10 is replaced with the ring-shaped stator complete powdered iron core 17 formed integrally with the ring-shaped stator powdered iron core 9 and divided into upper and lower layer portions, and a cross-sectional view taken along line G-G', in which the ring-shaped stator complete powdered iron core 17 is composed of two blocks divided in the up and down direction with respect to the 1-phase ring-shaped stator. FIG. 21D is a perspective view illustrating that the ring-shaped stator laminated iron core 10 is formed integrally with the ring-shaped stator powdered iron core 9, and a cross-sectional view taken along line G-G', in which the ring-shaped stator complete powdered iron core 17 is composed of an integrated block.

FIGS. 22 to 24 are exemplary diagrams illustrating various types of rotors of the inner rotor type permanent magnetic excited transverse flux motor in accordance with the present invention, in which the rotor powdered iron core 6 disposed between the rotor permanent magnets 5 is replaced with rotor laminated iron cores 18.

That is, FIG. 22 is a perspective view illustrating a rotor in which the rotor permanent magnets 5 and the rotor laminated iron cores 18 are bonded or welded with a ring-shaped non-magnetic material 19 in the inner circumference thereof.

Moreover, FIG. 23 is a perspective view illustrating a rotor in which the rotor permanent magnets 5 and the rotor laminated iron cores 18 are inserted into the ring-shaped non-magnetic material 19 in the inner circumference thereof. A wedge shape formed at the inner circumference of the rotor laminated iron core 18 is engaged with the non-magnetic material 19 and thus more firmly bonded thereto through the bonding or welding process at the same time.

As shown in FIG. 24 illustrating a rotor in which the rotor permanent magnets 5 are inserted into the rotor laminated iron cores 18, the rotor laminated iron cores 18 are formed integrally and the rotor permanent magnets 5 are inserted thereinto, thus being most firmly assembled, differently from the structures of FIGS. 22 and 23 in which the permanent magnets and the laminated iron cores are bonded to the non-magnetic material.

However, in the structure of FIG. 24 in which the laminated iron cores are formed integrally, the iron core portion connecting the two adjacent laminated iron cores with the permanent magnet disposed therebetween should have a thickness that is sufficiently magnetized by the permanent magnet.

As described above, according to the inner rotor type permanent magnet excited transverse flux motor in accordance with the present invention, a laminated structure in an axial direction or in a radial shape is applied to the stator powdered iron core so as to employ a small amount of permanent magnets compared with the conventional outer rotor type permanent magnet excited transverse flux motor, thus providing high output power, increasing the efficiency of power generation, and reducing noise and vibration.

Moreover, it is possible to reduce the material since the volume of the motor is small, and the manufacturing process is simplified using the powdered iron cores and the laminated iron cores.

Furthermore, according to the inner rotor type permanent magnet excited transverse flux motor in accordance with the present invention, the structure is simplified and the control is facilitated, thus improving the overall system performance, and reducing the material cost and energy loss.

As above, preferred embodiments of the present invention have been described and illustrated, however, the present invention is not limited thereto, rather, it should be understood that various modifications and variations of the present invention can be made thereto by those skilled in the art without departing from the spirit and the technical scope of the present invention as defined by the appended claims.

What is claimed is:

1. An inner rotor type permanent magnetic excited transverse flux motor comprising:
    a ring-shaped stator including a ring-shaped stator powdered iron core, at least two ring-shaped stator laminated iron cores, and a ring-shaped stator winding having a multilayer structure, the ring-shaped stator winding being wound around the ring-shaped powdered iron core, and a portion of the ring-shaped stator wining being disposed between two ring-shaped stator laminated iron cores; and a rotor including a rotor permanent magnet and a rotor powdered iron core, wherein the ring-shaped stator powdered iron core comprises a plurality of radial shape laminated iron cores connected by a fixing pin.

2. The inner rotor type permanent magnetic excited transverse flux motor of claim 1, wherein N number of ring-shaped stators are stacked in the axial direction of the rotor, and an axial length of the rotor is determined according to the number of the ring-shaped stators.

3. The inner rotor type permanent magnetic excited transverse flux motor of claim 2, wherein the ring-shaped stators are rotated by $$\frac{1}{N}\tau$$

with respect to a reference line based on a 1-phase ring-shaped stator such that an N-phase ring-shaped stator is rotated by $$\frac{N-1}{N}\tau$$

with respect to the reference line, wherein $\tau$ is an interval in the circumferential direction.

4. The inner rotor type permanent magnetic excited transverse flux motor of claim 1, wherein the ring-shaped stator laminated iron core has a laminated structure in a direction perpendicular to a direction in which a magnetic flux flows so as to reduce iron loss, and upper and lower layer portions of the ring-shaped stator laminated iron core are skewed from each other by $\tau$ spatially, wherein $\tau$ is an interval in the circumferential direction corresponding to a half of a cycle, if the cycle is $2\tau$, thus generating a thrust force in one direction.

5. The inner rotor type permanent magnetic excited transverse flux motor of claim 1, wherein the plurality of radial shape laminated iron cores are arranged at regular intervals and a spacer of a non magnetic material is inserted between the modules.

* * * * *